(12) United States Patent
Takahashi et al.

(10) Patent No.: US 11,500,323 B2
(45) Date of Patent: Nov. 15, 2022

(54) SHEET PROCESSING APPARATUS, LAMINATOR, IMAGE FORMING APPARATUS, AND IMAGE FORMING SYSTEM

(71) Applicant: Ricoh Company, Ltd., Tokyo (JP)

(72) Inventors: Wataru Takahashi, Tokyo (JP); Tomohiro Furuhashi, Kanagawa (JP); Sho Asano, Kanagawa (JP); Yoshito Suzuki, Chiba (JP); Shinya Monma, Kanagawa (JP); Johji Akiyama, Kanagawa (JP); Yohsuke Haraguchi, Kanagawa (JP); Wataru Nozaki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/313,153

(22) Filed: May 6, 2021

(65) Prior Publication Data
US 2021/0354948 A1   Nov. 18, 2021

(30) Foreign Application Priority Data

May 13, 2020  (JP) ............................. JP2020-084775
May 15, 2020  (JP) ............................. JP2020-086162

(51) Int. Cl.
*G03G 21/16* (2006.01)
*G03G 15/00* (2006.01)
(Continued)

(52) U.S. Cl.
CPC ....... *G03G 21/1638* (2013.01); *B32B 37/142* (2013.01); *B32B 37/185* (2013.01); *G03G 15/6529* (2013.01)

(58) Field of Classification Search
CPC .......... B32B 2037/0061; B32B 37/142; B32B 37/185; B32B 38/1841; B32B 41/00;
(Continued)

(56) References Cited

U.S. PATENT DOCUMENTS 5,217,561 A * 6/1993 Ueda ................... B32B 38/0036
                                                      219/508
6,893,521 B2 * 5/2005 Sasaki ................... B32B 37/185
                                                      156/367
(Continued)

FOREIGN PATENT DOCUMENTS

CN    105752719 A    7/2016
JP     7-002418     1/1995
(Continued)

OTHER PUBLICATIONS

Office Action dated May 17, 2022 in Chinese Patent Application No. 202110477544.7, 6 pages.

*Primary Examiner* — Francisco W Tschen
*Assistant Examiner* — Abhishek A Patwardhan
(74) *Attorney, Agent, or Firm* — Xsensus LLP

(57) ABSTRACT

A sheet processing apparatus is configured to sandwich one or more sheet media in a two-ply sheet in which two sheets are overlaid and bonded together at a portion of the two-ply sheet. The sheet processing apparatus includes circuitry configured to control insertion processing to insert the one or more sheet media into the two-ply sheet based on a length of the two-ply sheet in a conveyance direction, a length of one of the one or more sheet media in the conveyance direction, and a number of the one or more sheet media.

12 Claims, 25 Drawing Sheets

(51) Int. Cl.
    *B32B 37/14*   (2006.01)
    *B32B 37/18*   (2006.01)

(58) Field of Classification Search
    CPC .......... G03G 21/1638; G03G 15/6529; B65H 5/301; B65H 5/305; B65H 2801/27; B65H 37/04
    See application file for complete search history.

(56) References Cited

U.S. PATENT DOCUMENTS

| | | | |
|---|---|---|---|
| 7,946,326 B2* | 5/2011 | Lee | B65H 5/305 156/367 |
| 2005/0079968 A1* | 4/2005 | Trovinger | B65H 45/142 493/356 |
| 2008/0036132 A1 | 2/2008 | Moring | |
| 2016/0194168 A1 | 7/2016 | Kato et al. | |
| 2016/0257100 A1* | 9/2016 | Tachibana | B32B 37/0053 |
| 2017/0021603 A1* | 1/2017 | Kikuchi | B32B 37/182 |
| 2018/0257900 A1 | 9/2018 | Suzuki et al. | |
| 2019/0010011 A1 | 1/2019 | Watanabe et al. | |
| 2019/0276263 A1 | 9/2019 | Hidaka et al. | |
| 2019/0284008 A1 | 9/2019 | Sakano et al. | |
| 2019/0284009 A1 | 9/2019 | Suzuki et al. | |
| 2019/0284010 A1 | 9/2019 | Asami et al. | |
| 2019/0284011 A1 | 9/2019 | Furuhashi et al. | |
| 2019/0284012 A1 | 9/2019 | Yoneyama et al. | |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0270093 A1 | 8/2020 | Suzuki et al. | |
| 2020/0338877 A1 | 10/2020 | Takahashi et al. | |
| 2020/0341414 A1 | 10/2020 | Watanabe et al. | |
| 2020/0385231 A1 | 12/2020 | Kunieda et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |

FOREIGN PATENT DOCUMENTS

| | | |
|---|---|---|
| JP | 9-150456 | 6/1997 |
| JP | 9-164593 | 6/1997 |
| JP | 2006-160429 | 6/2006 |
| JP | 2006-290370 A | 10/2006 |
| JP | 2010-264681 A | 11/2010 |
| JP | 2015-143140 A | 8/2015 |

* cited by examiner

FIG. 24A

LAMINATION SETTINGS

■ LAMINATION FILM SIZE

FOR A4 SIZE

■ INSERTION SHEET SIZE

A5 LANDSCAPE

■ INSERTION SHEET NUMBER

2

EXECUTE LAMINATION

FIG. 24B

LAMINATION SETTINGS

■ LAMINATION FILM SIZE

FOR A4 SIZE

■ INSERTION SHEET SIZE

A5 LANDSCAPE

■ INSERTION SHEET NUMBER

3

!! CHANGE NUMBER OF INSERTION SHEETS !!

EXECUTE LAMINATION

| FIG. 29A |
| FIG. 29B |
| FIG. 29C |

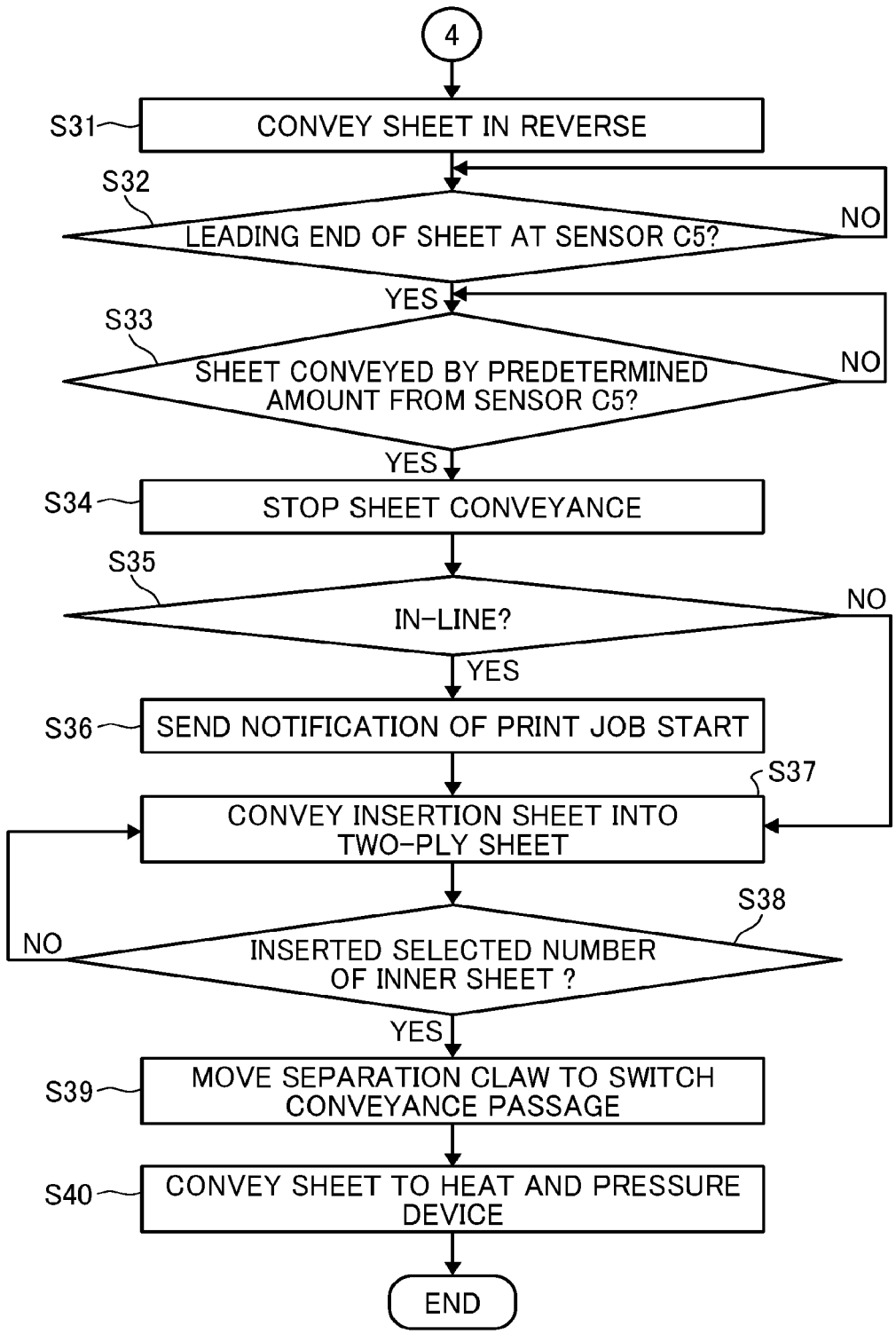

| FIG. 39A |
| FIG. 39B |
| FIG. 39C |

SHEET PROCESSING APPARATUS, LAMINATOR, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119(a) to Japanese Patent Applications No. 2020-084775, filed on May 13, 2020, and No. 2020-086162, filed on May 15, 2020, in the Japan Patent Office, the entire disclosure of which is incorporated by reference herein.

BACKGROUND

Technical Field

This disclosure relates to a sheet processing apparatus, a laminator, an image forming apparatus, and an image forming system.

Related Art

There is known a lamination technique of inserting an insertion sheet (paper, photo, etc.) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

SUMMARY

This specification describes an improved sheet processing apparatus configured to sandwich one or more sheet media in a two-ply sheet in which two sheets are overlaid and bonded together at a portion of the two-ply sheet. The sheet processing apparatus includes circuitry configured to control insertion processing to insert the one or more sheet media into the two-ply sheet based on a length of the two-ply sheet in a conveyance direction, a length of one of the one or more sheet media in the conveyance direction, and a number of the one or more sheet media.

This specification further describes an improved sheet processing apparatus in which the sheet medium is sandwiched by the two-ply sheet made of two sheets overlaid and bonded together at one end. The sheet processing apparatus includes a first conveyer configured to convey the sheet medium and a second conveyer configured to convey the two-ply sheet. The sheet processing apparatus can insert at least one sheet medium into the two-ply sheet and includes circuitry configured to perform a single insertion mode in which one sheet medium is inserted into the two-ply sheet and a multiple insertion mode in which a plurality of sheet media are inserted into the two-ply sheet along the conveyance direction. The circuitry in the sheet processing apparatus is configured to be able to arbitrarily adjust the relative position of the sheet medium with respect to the two-ply sheet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 24A and 24B are views illustrating examples of an operation screen displayed on a control panel of the sheet processing apparatus illustrated in FIG. 1 to set a lamination sheet size, an insertion sheet size, and a number of the lamination sheets;

Figure 1:
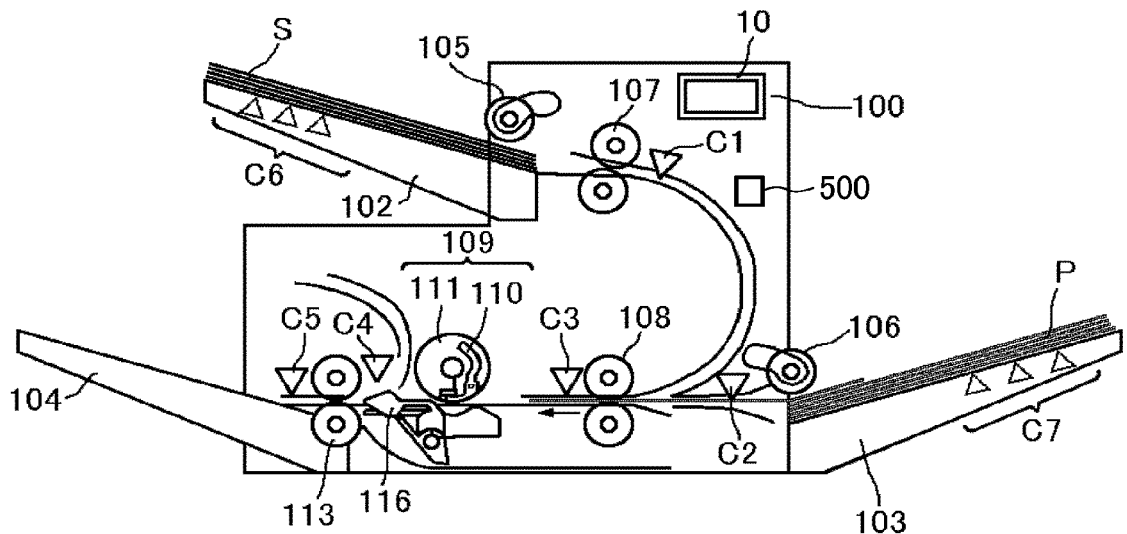
FIG. 1 is a schematic view illustrating a general arrangement of a sheet processing apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

FIG. 1 is a schematic view illustrating a general arrangement of a sheet processing apparatus according to one embodiment of the present disclosure. A sheet processing apparatus 100 according to the present embodiment is to separate two sheets (plies) of a two-ply sheet (hereinafter referred to as a lamination sheet S) and to insert and sandwich an insertion sheet P (that is a sheet medium) between the separated sheets of the two-ply sheet.

The lamination sheet S is a two-ply sheet in which two sheets are overlaid and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side thereof. The two-ply sheet also includes a lamination film.

The insertion sheet P is an example of the sheet medium that is inserted into the two-ply sheet. The sheet medium may be thick paper, postcards, envelopes, plain paper, thin paper, coated paper, art paper, tracing paper, overhead projector (OHP) transparencies, and the like.

As illustrated in FIG. 1, a sheet processing apparatus 100 includes a sheet tray 102 as a first tray on which the lamination sheets S are placed, a pickup roller 105 that feeds the lamination sheet S from the sheet tray 102, and a conveyance roller pair 107. The sheet processing apparatus 100 further includes a sheet feeding tray 103 as a second tray on which the insertion sheet P is placed, and a pickup roller 106 that feeds the insertion sheet P from the sheet feeding tray 103.

In the sheet tray 102, a sheet size sensor C6 is disposed. The sheet size sensor C6 serves as a size detector for the sheet to detect the size of the lamination sheet S that is a length of the lamination sheet S in a conveyance direction. In the sheet feeding tray 103, a sheet size sensor C7 is disposed. The sheet size sensor C7 serves as a size detector for a medium to detect the size of the insertion sheet P that is a length of the insertion sheet P in the conveyance direction.

Each of the sheet size sensor C6 and the sheet size sensor C7 includes a plurality of sensors arranged side by side in the conveyance direction. Since the detection results of the sensors change depending on the size of the stacked lamination sheet S (or the insertion sheet P), the sheet size sensors C6 and C7 can detect the length of the lamination sheet S (or the insertion sheet P) in the conveyance direction.

A sheet sensor C1 to detect the position of the lamination sheet S being conveyed is disposed downstream from a conveyance roller pair 107 in the conveyance direction of the lamination sheet S. A sheet sensor C2 to detect the position of the insertion sheet P being conveyed is disposed downstream from a pickup roller 106 in the conveyance direction of the insertion sheet P.

The sheet sensors C1 and C2 may be used to detect the length of the lamination sheet S (or the insertion sheets P) in the conveyance direction.

Downstream from the conveyance roller pair 107 and the pickup roller 106 in the sheet conveyance direction, the sheet processing apparatus 100 further includes an entrance roller pair 108 as a first conveyor, a winding roller 109 as a rotator, an exit roller pair 113 as a second conveyor, and an output tray 104. The sheet processing apparatus 100 further includes a separation claw 116 between the winding roller 109 and the exit roller pair 113. The separation claw 116 is movable in the width direction of the sheet S.

A sheet sensor C3 to detect the position of the lamination sheet S and the insertion sheet P being conveyed is disposed downstream from the entrance roller pair 108 in the conveyance direction. An abnormality detector C4 to detect the state of the lamination sheet S is disposed downstream from the winding roller 109 in the conveyance direction. The abnormality detector C4 also functions as a sheet sensor C4. A sheet sensor C5 to detect the position of the lamination sheet S being conveyed is disposed downstream from the exit roller pair 113 in the conveyance direction.

The pickup roller 105, the conveyance roller pair 107, the entrance roller pair 108, and the winding roller 109 are examples of a first feeder to feed a two-ply sheet. The pickup roller 106, the entrance roller pair 108 and the winding roller 109 are examples of a second feeder.

On the exterior of the sheet processing apparatus 100, a control panel 10 is provided as a display and operation device that displays information on the sheet processing apparatus 100 and receives operation input. Further, the control panel 10 also serves as a notification device to output a perceptual signal to a user. As an alternative, a notification device other than the control panel 10 may be separately provided in the sheet processing apparatus 100. Additionally, the sheet processing apparatus 100 includes a controller 500 that is circuitry. The controller 500 receives input signals from the control panel 10 and the above-described sensors and controls the control panel 10, rotations of the above-described rollers, or the like. The controller 500 in the present embodiment is disposed in the main body of the sheet processing apparatus 100 but may be disposed outside the main body. The controller may be a controller of an image forming apparatus, a controller of an image forming system, or a personal computer outside the main body of the sheet processing apparatus 100.

The sheet processing apparatus 100 according to the present embodiment stores the lamination sheet S and the insertion sheet P on separate trays. The sheet processing apparatus 100 opens the lamination sheet S and inserts the insertion sheet P therein while conveying the lamination sheet S. Then, the exit roller pair 113 ejects and stacks the lamination sheet S, in which the insertion sheet P is inserted, onto the output tray 104.

Figure 2:
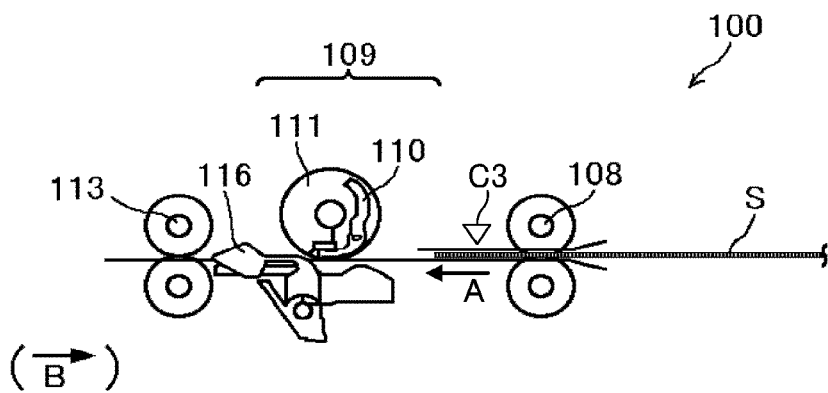
FIG. 2 is a view illustrating a main part of the sheet processing apparatus illustrated in FIG. 1, conveying a lamination sheet toward a winding roller.

FIG. 2 is a view of a main part of the sheet processing apparatus 100 illustrated in FIG. 1. As illustrated in FIG. 2, each of the entrance roller pair 108 and the exit roller pair 113 is, for example, two rollers paired with each other and driven by a driver such as a motor. The controller 500 controls the driver to control rotations of the entrance roller pair 108 and the exit roller pair 113. The entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. The conveyance direction indicated by arrow A is also referred to as a forward conveyance direction or a direction A.

In contrast, the exit roller pair 113 can switch the direction of rotation between the forward direction and the reverse direction. The exit roller pair 113 can convey the nipped lamination sheet S in the forward conveyance direction that is a direction toward the output tray 104 (see FIG. 1) and in a direction reverse to the forward direction that is a direction in which the lamination sheet S is drawn back toward the winding roller 109. The conveyance direction toward the winding roller 109 (the direction indicated by arrow B and the direction reverse to the forward conveyance direction) is referred to as the reverse conveyance direction or a direction B.

Between the entrance roller pair 108 and the exit roller pair 113, the sheet processing apparatus 100 further includes the winding roller 109 that is a rotator and the separation claw 116. Driven by a driver (motor or the like), the winding roller 109 rotates in the forward and reverse directions, and the direction of rotation can be switched between the forward direction and the reverse direction (clockwise and counterclockwise). The controller 500 controls the driver to control rotations of the winding roller 109 and operations of the separation claw 116.

The winding roller 109 includes a roller 111 and a movable sheet gripper 110 disposed on the roller 111 to grip the lamination sheet S. The movable sheet gripper 110 grips an end of the lamination sheet S together with the roller 111. The sheet gripper 110 may be integral with the outer circumference of the roller 111 or may be a separate component. The controller 500 controls a driver to move the sheet gripper 110.

With reference to FIGS. 1 to 18, a description is given of a series of processes of the sheet processing apparatus 100, that is, operations from separation of the lamination sheet S to insertion of the insertion sheet P. The controller 500 controls the series of processes to perform the operations. In FIGS. 3 to 18, elements identical to those illustrated in FIG. 1 or 2 are given identical reference numerals, and the descriptions thereof are omitted.

In FIG. 1, the lamination sheets S are stacked on the sheet tray 102 such that the bonded side is on the downstream side in the direction of feeding (that is, the conveyance direction) of the pickup roller 105. In the sheet processing apparatus 100, the pickup roller 105 picks up the lamination sheet S from the sheet tray 102, and the conveyance roller pair 107 conveys the lamination sheet S toward the entrance roller pair 108.

Next, as illustrated in FIG. 2, the entrance roller pair 108 conveys the lamination sheet S toward the winding roller 109. In the sheet processing apparatus 100, the entrance roller pair 108 conveys the lamination sheet S with the bonded end (the bonded end is one of four sides) on the downstream side in the forward conveyance direction indicated by arrow A (direction A).

Figure 3:
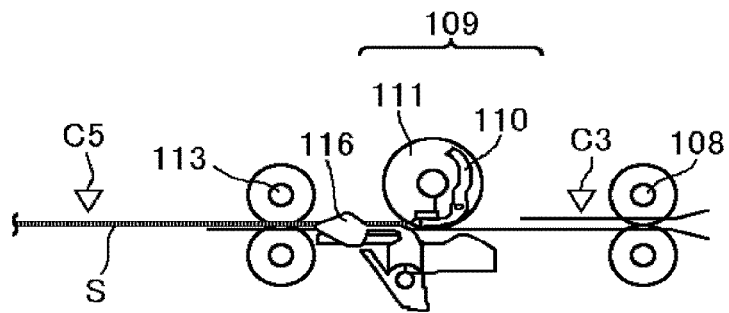
FIG. 3 is a view illustrating the main part of the sheet processing apparatus temporarily stopping sheet conveyance, subsequent to the state in FIG. 2.

Subsequently, as illustrated in FIG. 3, the controller 500 in the sheet processing apparatus 100 temporarily stops conveyance of the lamination sheet S after the rear end of the lamination sheet S in the forward conveyance direction passes the winding roller 109. That is, the controller 500 receives a trigger signal from the sheet sensor C3 when the sheet sensor C3 detects the leading end of the lamination sheet S and controls the rotations of the entrance roller pair 108 and the exit roller pair 113 to convey the lamination sheet S by a designated amount from the sheet sensor C3.

Figure 4:
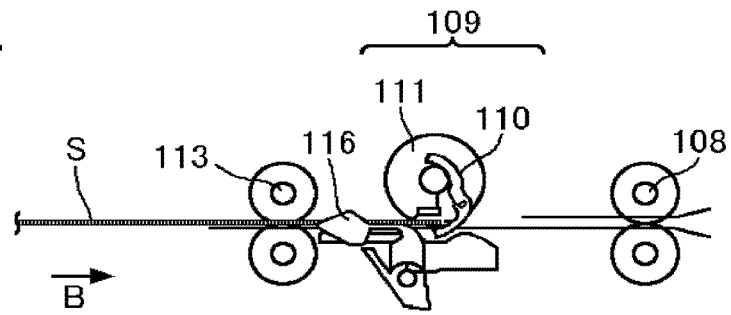
FIG. 4 is a view illustrating the main part of the sheet processing apparatus conveying the lamination sheet, subsequent to the state in FIG. 3.

Next, as illustrated in FIG. 4, the controller 500 in the sheet processing apparatus 100 controls the driver to open the sheet gripper 110, reverse the rotation direction of the exit roller pair 113, and convey the lamination sheet S in the reverse conveyance direction (direction B) toward the opened sheet gripper 110.

Figure 5:
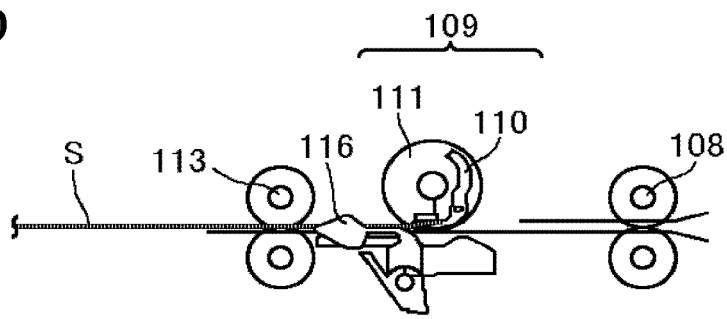
FIG. 5 is a view illustrating the main part of the sheet processing apparatus in a state subsequent to the state in FIG. 4.

Subsequently, as illustrated in FIG. 5, the controller 500 in the sheet processing apparatus 100 controls the rotations of the exit roller pair 113 to temporarily stop conveyance of the lamination sheet S when the end of the lamination sheet S is inserted in the sheet gripper 110 and controls the driver to close the sheet gripper 110 to grip the end of the lamination sheet S. After the exit roller pair 113 conveys the lamination sheet S by a designated amount, the controller 500 performs the above-described action.

Figure 6:
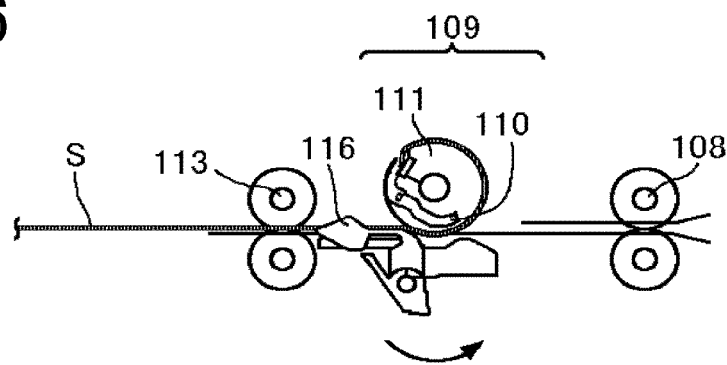
FIG. 6 is a view illustrating the main part of the sheet processing apparatus in which the winding roller rotates in reverse to wind the lamination sheet around the winding roller, subsequent to the state in FIG. 5.

Then, as illustrated in FIG. 6, the controller 500 in the sheet processing apparatus 100 controls the driver to rotate the winding roller 109 counterclockwise in the drawings and wind the lamination sheet S around the winding roller 109. The lamination sheet S is wound around the winding roller 109 from the side where the two overlapping sheets of the lamination sheet S are not bonded.

Figure 7:
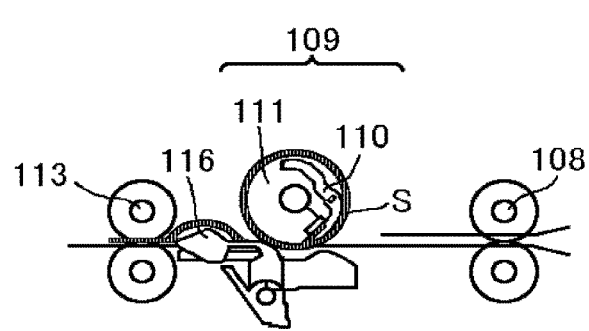
FIG. 7 is a view illustrating the main part of the sheet processing apparatus in which separation claws are inserted into a space between two sheets (plies) of the lamination sheet, subsequent to the state in FIG. 6.

As illustrated in FIG. 7, when the lamination sheet S that is the two-ply sheet is wound around the winding roller 109, a winding circumferential length difference is created between the two sheets in the amount of winding of the lamination sheet S around circumference of the winding roller 109. There is a surplus of the inner ply, which becomes loose toward the bonded end. As a result, a space is created between the two sheets constructing the two-ply sheet. As inserting the separation claws 116 are inserted into the generated space from both sides of the lamination sheet S, the space between the two sheets can be reliably maintained. The controller 500 receives a trigger signal from the sheet sensor C5 when the sheet sensor C5 detects the end of the lamination sheet S and controls the driver to perform the above-described operations when the exit roller pair 113 conveys the lamination sheet S by a designated amount from the sheet sensor C5.

The following describes the separation claws 116.

Figure 19:
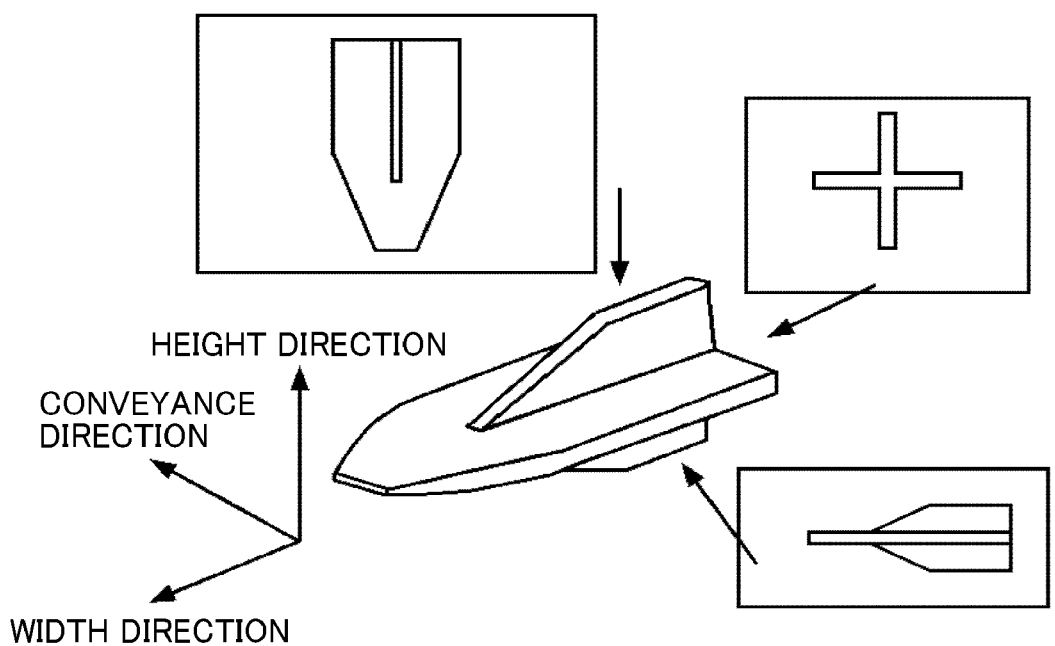
FIG. 19 is a schematic view of one of separation claws of the sheet processing apparatus illustrated in FIG. 1.
Figure 20A:
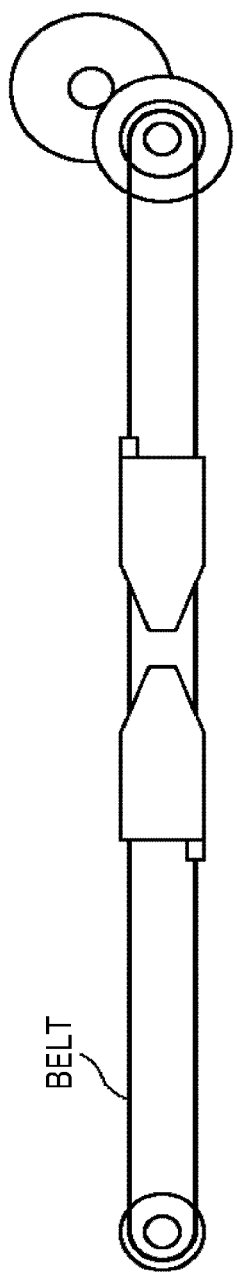
FIGS. 20A and 20B are schematic views illustrating examples of a drive configuration of the separation claw illustrated in FIG. 19.
Figure 20B:
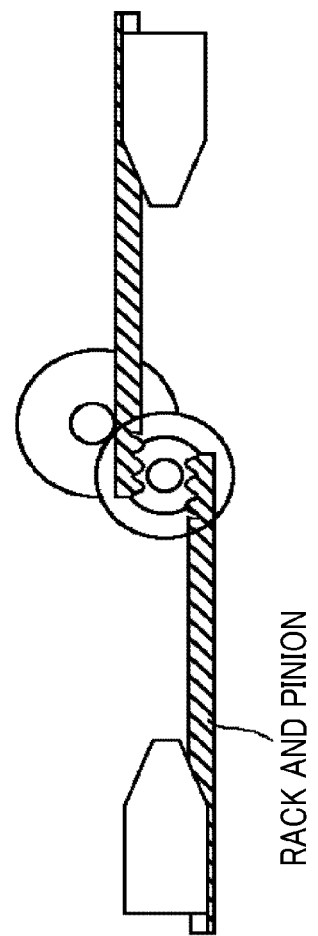
Figure 21:
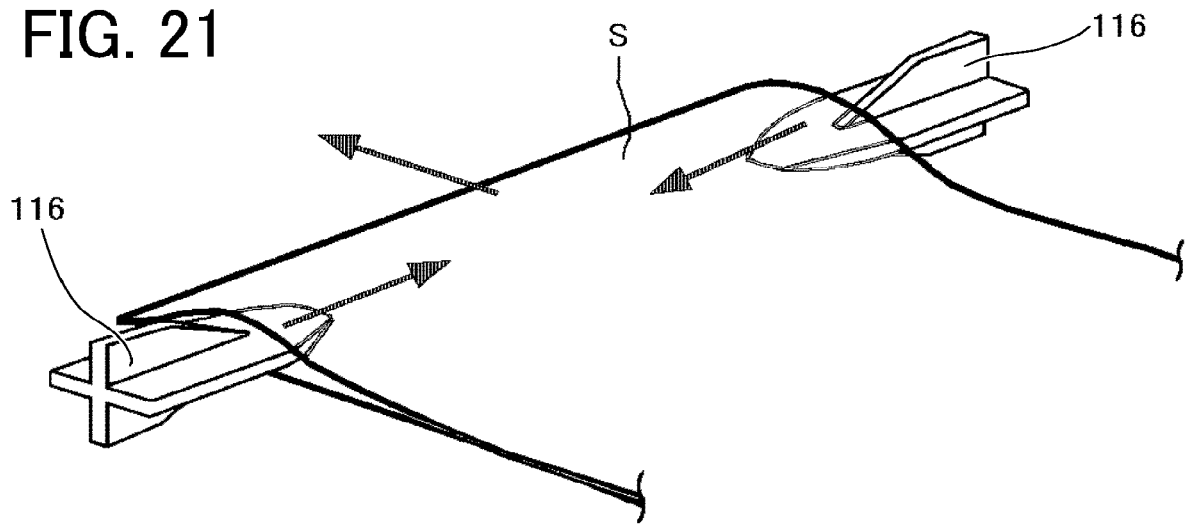
FIG. 21 is a perspective view illustrating a state in which the separation claws are inserted into a lamination sheet.

FIG. 19 is a schematic view of the separation claw 116 of the sheet processing apparatus 100. FIGS. 20A and 20B are schematic views illustrating an example of a drive configuration of the separation claw 116. Further, FIG. 21 is a perspective view illustrating a state in which the separation claw 116 is inserted in the lamination sheet S.

As illustrated in FIG. 19, when viewed from the upstream side in the conveyance direction, the height of the separation claw 116 gradually increases from the center in the width direction to the right end in FIG. 19. Further, when viewed in the height direction, the size of the separation claw 116 in the conveyance direction gradually increase from the tip to the center. When viewed in the width direction, the separation claw 116 is shaped like a cross.

Further, in the present embodiment, referring to FIGS. 20A and 20B, the two separation claws 116 are disposed facing each other and moved in the approaching direction and the moving away direction by a belt drive mechanism as illustrated in FIG. 20A, a rack and pinion mechanism illustrated in FIG. 20B, or the like.

As described above, in the present embodiment, the pair of separation claws 116 having the above-mentioned shape is movable in the width direction of the lamination sheet S. Accordingly, the separation claws 116 can be smoothly inserted into the gap created in the lamination sheet S as illustrated in FIG. 21.

Figure 8:
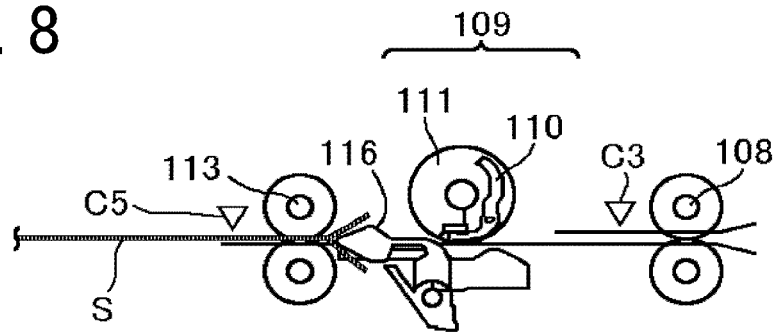
FIG. 8 is a view illustrating the main part of the sheet processing apparatus in which the winding roller rotates in a forward direction so as to move the space in the lamination sheet and the separation claws to the rear end of the lamination sheet.

A description of the operation of the sheet processing apparatus 100 is continued below. With the separation claws 116 inserted in the space in the lamination sheet S, the controller 500 in the sheet processing apparatus 100 controls the driver to rotate the winding roller 109 clockwise in the drawings (see FIG. 7). After the winding roller 109 is rotated by a predetermined amount, the controller 500 controls the driver to open the sheet gripper 110. The space in the lamination sheet S moves to the rear end of the lamination sheet S in the forward conveyance direction (direction A) as illustrated in FIG. 8. As a result, the end portion of the lamination sheet S is separated into the upper and lower sheets.

In this state, the controller 500 in the sheet processing apparatus 100 controls the driver to temporarily stop the conveyance of the lamination sheet S and further move the separation claws 116 in the sheet width direction to separate the rear end of the lamination sheet S in the entire range. The controller 500 uses the trigger signal from the sheet sensor C5 when the sheet sensor C5 detects the end of the lamination sheet S and controls the driver to perform the above-described operations when the exit roller pair 113 conveys the lamination sheet S by a designated amount from the sheet sensor C5.

Figure 22:
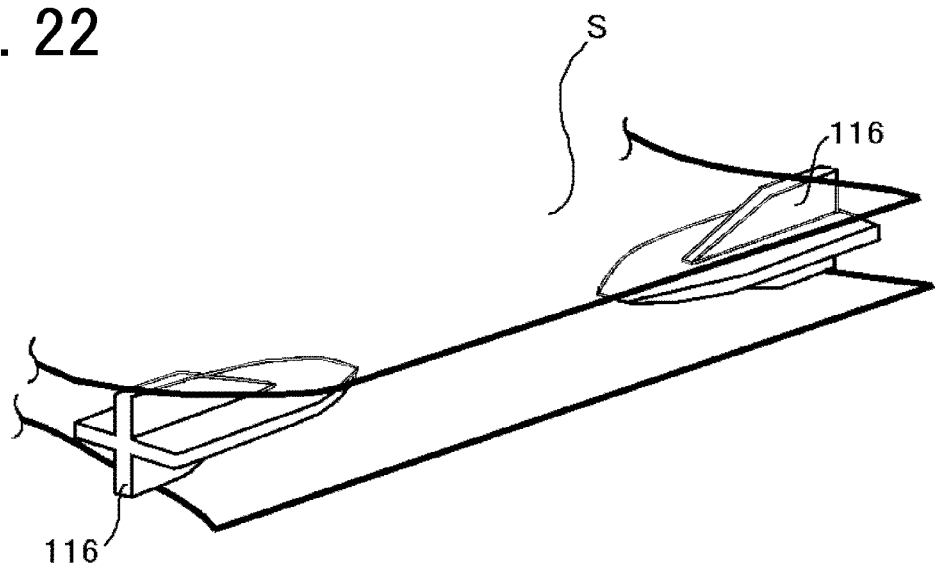
FIG. 22 is a perspective view illustrating the separation claws and the lamination sheet in the state illustrated in FIG. 8.

FIG. 22 is a perspective view illustrating a state of the separation claws 116 and the lamination sheet S in FIG. 8. Since the separation claw 116 also has the function of the bifurcating claw that guides the separated sheets of the lamination sheet S in different directions due to the above-described shape (see FIG. 19), the two separated sheets of the lamination sheet S can be kept in postures to be conveyed to different paths.

Figure 23:
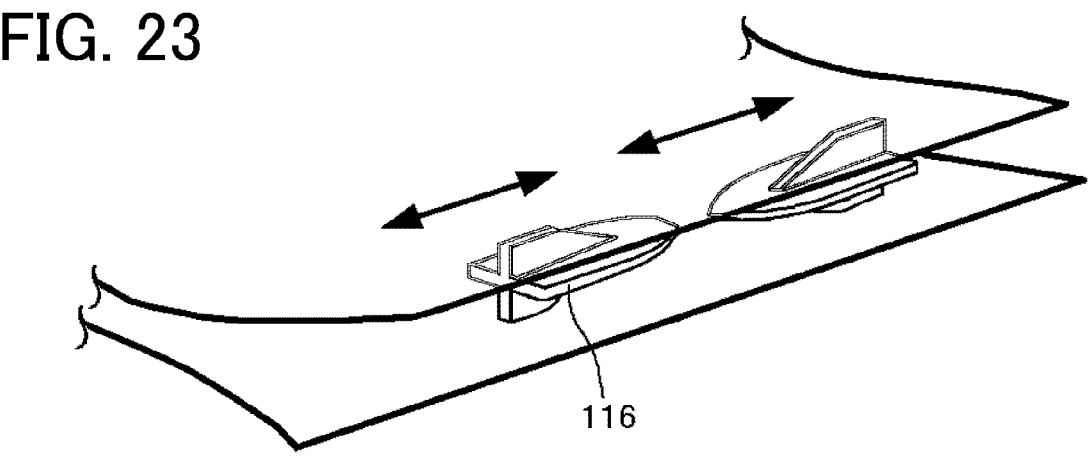
FIG. 23 is another perspective view illustrating the separation claws and the lamination sheet in the state illustrated in FIG. 8.

Further, since the separation claws 116 are movable in the width direction (see FIGS. 20A and 20B), the separation claws 116 can be positioned suitably to support the postures of the sheets of the lamination sheet S as illustrated in FIG. 23. Therefore, even when the size of the lamination sheet S and the rigidity (or retentivity meaning the propensity to retain a particular shape once applied, such as curvature of paper) change, the separated sheets of the lamination sheet S can be guided in desired branching directions. This eliminates the need for a bifurcating member (e.g., a bifurcating claw) over the entire width of the conveyance passage and a driver to drive the bifurcating member, and the cost can be reduced.

Figure 9:
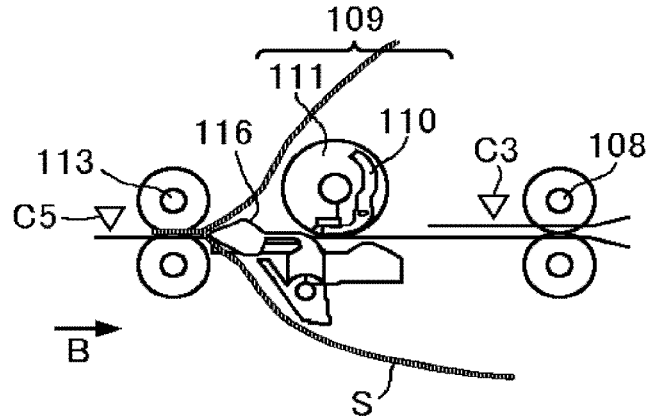
FIG. 9 is a view illustrating the sheet processing apparatus conveying the lamination sheet in reverse with ends of the two sheets separated, subsequent to the state in FIG. 8.

Next, after the separation claws 116 separate the rear end of the lamination sheet S in the entire range, as illustrated in FIG. 9, the controller 500 in the sheet processing apparatus 100 controls the driver to rotate the exit roller pair 113 counterclockwise in FIG. 9 and convey the lamination sheet S in the reverse conveyance direction (direction B). Then, the separation claws 116 guide the two separated sheets of the lamination sheet S in the upper and lower directions, respectively, and the sheets are fully separated.

Then, the controller 500 in the sheet processing apparatus 100 controls the driver to temporarily stop the conveyance of the lamination sheet S, with the bonded portion of the lamination sheet S held (nipped) in the exit roller pair 113.

Accordingly, the lamination sheet S has the bonded side as one end and widely opens the other end.

The controller 500 uses the trigger signal from the sheet sensor C5 when the sheet sensor C5 detects the end of the lamination sheet S and controls the driver to perform the above-described operations when the exit roller pair 113 conveys the lamination sheet S by a designated amount from the sheet sensor C5.

Figure 10A:
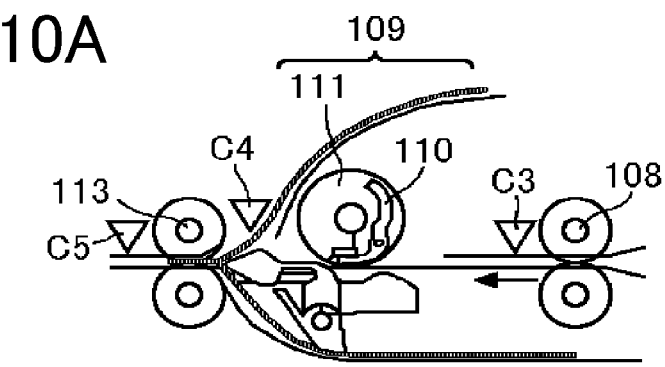
FIG. 10A is a view illustrating guide routes of two sheets of the lamination sheet in the state illustrated in FIG. 9.
Figure 10B:
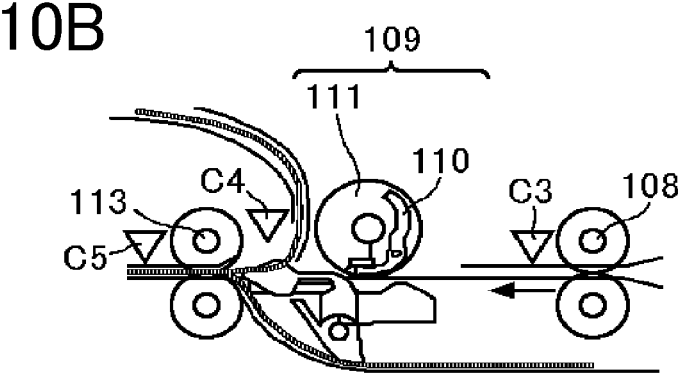
FIGS. 10B and 10C are views illustrating modifications of the guide routes of the two sheets of the lamination sheet.
Figure 10C:
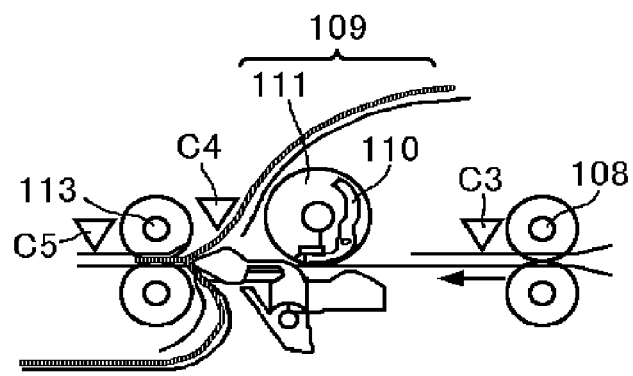

Referring to FIGS. 10A, 10B, and 10C, a description is given of modifications of the guide routes of the two separated piles (the upper and lower sheets) of the lamination sheet S. FIG. 10A illustrates the above-described routes (see FIG. 9) for guiding the upper and lower sheets in the same direction from the bonded portion of the lamination sheet S. Alternatively, the upper and lower sheets may be guided in opposite directions. For example, as illustrated in FIG. 10B, the routes may be in an inverted S-shape. Alternatively, as illustrated in FIG. 10C, the routes may be in an S-shape.

A description is provided of an advantageous configuration of the present disclosure.

The sheet processing apparatus 100 of the present embodiment inserts one to a plurality of insertion sheets P into the sheet S depending on the size of the sheet S (that is the length of the sheet S in the conveyance direction) and the size of the insertion sheet P (that is the length of the insertion sheet P in the conveyance direction). Firstly, a single insertion mode is described, and next, a multiple insertion mode is described. In the single insertion mode, the sheet processing apparatus 100 inserts the one insertion sheet P into the lamination sheet S. In the multiple insertion mode, the sheet processing apparatus 100 inserts a plurality of insertion sheets P into the lamination sheet S along the conveyance direction.

Figure 11:
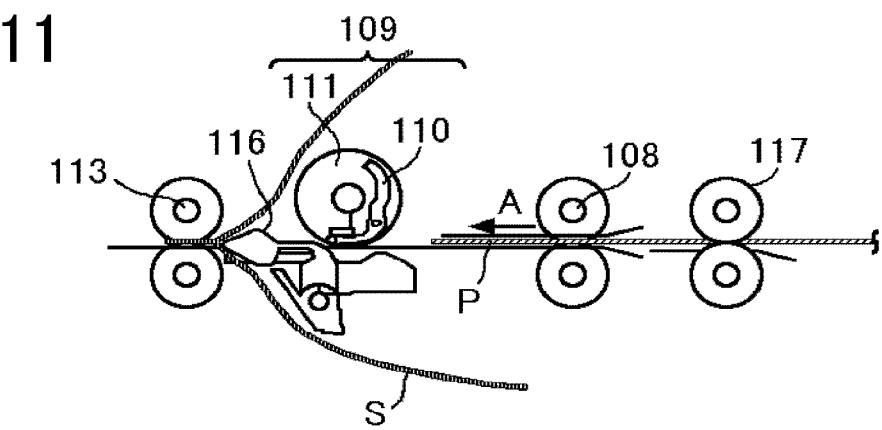
FIG. 11 is a view illustrating the sheet processing apparatus performing a single insertion mode, conveying an insertion sheet.

In the single insertion mode, as illustrated in FIG. 11, the controller 500 in the sheet processing apparatus 100 controls rotations of the entrance roller pair 108 to convey the insertion sheet P conveyed from the sheet feeding tray 103 (see FIG. 1) toward the exit roller pair 113 in the forward conveyance direction in the direction A.

Figure 12:
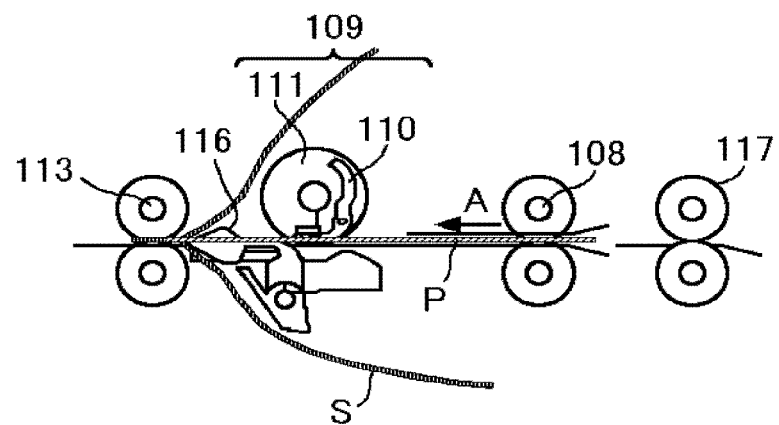
FIG. 12 is a view illustrating the sheet processing apparatus performing the single insertion mode, inserting the insertion sheet into the separated lamination sheet after the state in FIG. 11.

Subsequently, as illustrated in FIG. 12, the controller 500 in the sheet processing apparatus 100 controls rotations of the exit roller pair 113 so that the lamination sheet S and the insertion sheet P converge to insert the insertion sheet P into the opened lamination sheet S.

Figure 13:
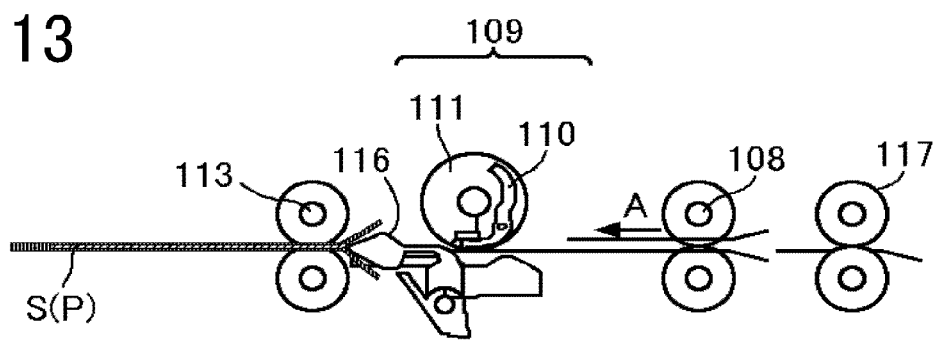
FIG. 13 is a view illustrating the sheet processing apparatus performing the single insertion mode, overlaying the two sheets one on another after the state in FIG. 12.

As illustrated in FIG. 13, the exit roller pair 113 in the sheet processing apparatus 100 conveys the lamination sheet S, with the insertion sheet P inserted therein, in the forward conveyance direction (direction A), thereby overlaying the two sheets one on another again and closing the opening. A roller disposed downstream from the exit roller pair 113 ejects and stacks the lamination sheet S sandwiching the insertion sheet P onto the output tray 104 (FIG. 1).

Next, the multiple insertion mode is described. In the multiple insertion mode, a plurality of insertion sheets P (two sheets in the following embodiment) are arranged and inserted in the conveyance direction.

Figure 14:
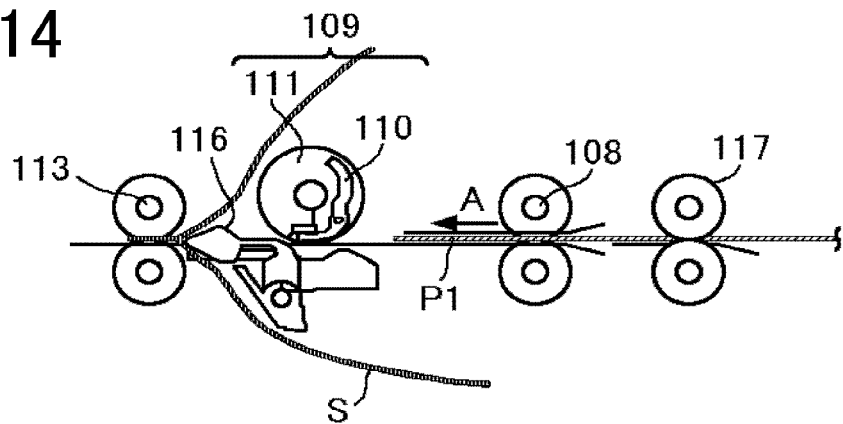
FIG. 14 is a view illustrating the sheet processing apparatus performing a multiple insertion mode, conveying a first insertion sheet.

As illustrated in FIG. 14, the controller 500 in the sheet processing apparatus 100 controls the rotations of the entrance roller pair 108 to convey a first insertion sheet (hereinafter referred to as a first insertion sheet P1) conveyed from the sheet feeding tray 103 (see FIG. 1) toward the exit roller pair 113 in the forward conveyance direction in the direction A.

Figure 15:
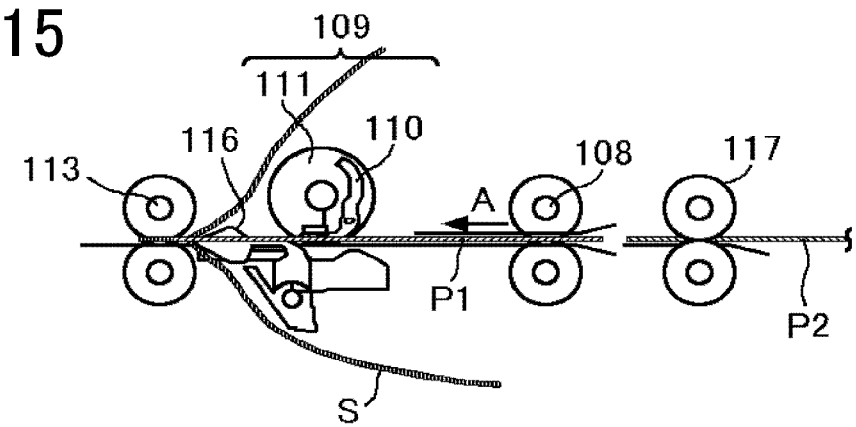
FIG. 15 is a view illustrating the sheet processing apparatus performing the multiple insertion mode, inserting the first insertion sheet into the lamination sheet and conveying a second insertion sheet after the state in FIG. 14.

Subsequently, as illustrated in FIG. 15, the controller 500 in the sheet processing apparatus 100 controls the rotations of the exit roller pair 113 so that the lamination sheet S and the first insertion sheet P1 converge to insert the first insertion sheet P1 into the opened lamination sheet S. At this time, the controller 500 controls the driver to rotate the pickup roller 106 and convey the second insertion sheet (hereinafter referred to as a second insertion sheet P2) from the sheet feeding tray 103 (see FIG. 1) toward the exit roller pair 113 in the forward conveyance direction (the direction A).

Figure 16:
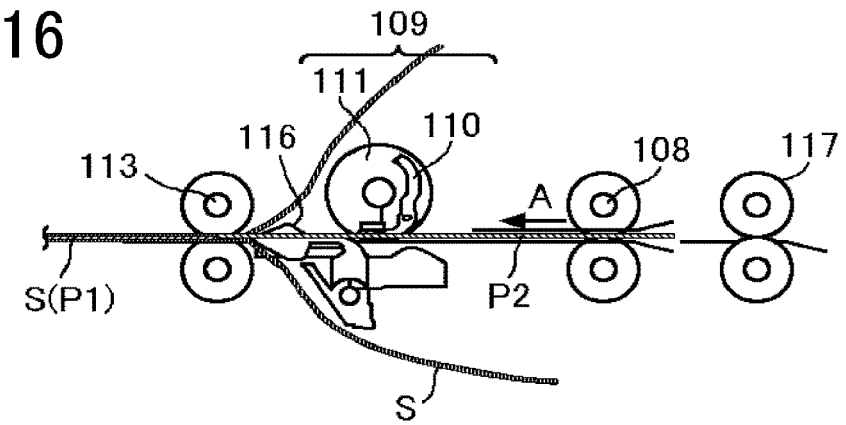
FIG. 16 is a view illustrating the sheet processing apparatus performing the multiple insertion mode, inserting the second sheet into the lamination sheet after the state in FIG. 15.

Subsequently, as illustrated in FIG. 16, the controller 500 in the sheet processing apparatus 100 controls the rotations of the entrance roller pair 108 so that the lamination sheet S and the second insertion sheet P2 converge to insert the second insertion sheet P2 into the opened lamination sheet S.

Figure 17:
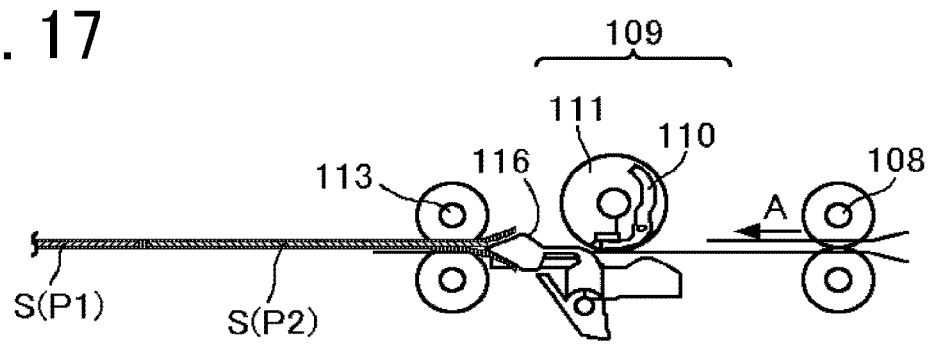
FIG. 17 is a view illustrating the sheet processing apparatus performing the multiple insertion mode, overlaying the two sheets one on another after the state in FIG. 16.

As illustrated in FIG. 17, the exit roller pair 113 in the sheet processing apparatus 100 conveys the lamination sheet S, with the first and second insertion sheets P1 and P2 inserted therein, in the forward conveyance direction (direction A), thereby overlaying the two sheets one on another again and closing the opening.

Even if there are three or more insertion sheets, the insertions sheets can be sandwiched by substantially the same operations.

Figure 18:
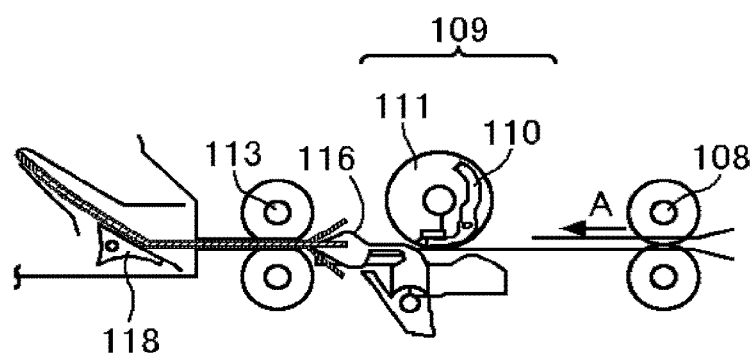
FIG. 18 is a view of an example of a main part of the sheet processing apparatus including a bifurcating claw.

As an alternative example, in the case of a sheet processing apparatus including a heat and pressure device capable of heating and pressurizing the lamination sheet S, as illustrated in FIG. 18, the route is switched with a bifurcating claw 118 to forward the lamination sheet S to the heat and pressure device. Not only in the multiple insertion mode but also in the single insertion mode, the route may be switched with the bifurcating claw 118 similarly.

As described above, the controller 500 in the sheet processing apparatus 100 according to the present embodiment can control the driver and other parts to perform insertion processing to insert the insertion sheet P into the lamination sheet S.

The following describes a configuration in which the controller 500 in the sheet processing apparatus 100 acquires the size of the lamination sheet S, the size of the insertion sheet P, which are lengths in the conveyance direction of the sheet S and the insertion sheets P, and the number of the insertion sheets P to be sandwiched.

As illustrated in FIG. 1, the sheet processing apparatus 100 according to the present embodiment includes the sheet size sensor C6 serving as a size detector for the sheet and the sheet size sensor C7 serving as the size detector for the medium. Based on the detection results of the sheet size sensors C6 and C7, the controller 500 in the sheet processing apparatus 100 determines whether the length of the insertion sheet P in the conveyance direction is equal to or smaller than a threshold value. When the length of the insertion sheet P in the conveyance direction is equal to or smaller than the threshold value, the controller 500 automatically switches to the multiple insertion mode and performs the insertion processing. In contrast, when the length of the insertion sheet P in the conveyance direction is larger than the threshold value, the controller 500 automatically switches to the single sheet insertion mode and performs the insertion processing.

In particular, when the length of the insertion sheet P in the conveyance direction is equal to or less than half the length of the lamination sheet S in the conveyance direction, the controller 500 may automatically switch to the multiple insertion mode and perform the insertion processing. In the multiple insertion mode, the controller 500 determines the number of insertion sheets P sandwiched in the lamination sheet S from the quotient of the size of the lamination sheet S divided by the size of insertion sheet P.

Instead of or in addition to the detection results of the sheet size sensors C6 and C7, the controller 500 may use the detection results of the sheet sensors C1 and C2.

As described above, the controller 500 in the sheet processing apparatus 100 according to the present embodiment can automatically control the insertion processing according to the sizes of the lamination sheet S and the insertion sheet P.

The following describes a configuration for the user to input data and select the insertion modes. FIGS. 24A and 24B are views illustrating examples of an operation screen to set a lamination sheet size, an insertion sheet size, and a number of the lamination sheets that are displayed on a control panel of the sheet processing apparatus illustrated in FIG. 1.

As illustrated in FIG. 24A, the sheet processing apparatus 100 according to the present embodiment accepts selecting and inputting the size of the lamination sheet S (lamination film), the size of the insertion sheet P, and the number of the insertion sheets P sandwiched, which are performed by the user by touching the screen on the control panel 10.

However, when the sum of the lengths of the insertion sheets P in the conveyance direction is equal to or larger than the length of the lamination sheet S in the conveyance direction, the controller 500 in the sheet processing apparatus 100 determines that the input data are wrong. As illustrated in FIG. 24 B, the controller 500 controls the control panel 10 to display an error message and prompt the user to select and input the sizes or the number described above again.

Specifically, the controller 500 controls the control panel 10 to accept the data input by the user when the following size condition is satisfied, that is, $L1 \geq L2 \times n$ where $L1$ is the length of the lamination sheet S in the conveyance direction, $L2$ is the length of the insertion sheet P in the conveyance direction, and $n$ is the number of the insertion sheets sandwiched by the lamination sheet S.

After the controller 500 in the sheet processing apparatus 100 accept the data, the controller 500 performs the insertion processing to insert the insertion sheet P into the sheet S.

On the other hand, if $L1 < L2 \times n$, the controller 500 controls the control panel 10 to notify the user a message, that is, display the error message and prompt the user to select and input the sizes or the number again.

In this way, the user can select either the single insertion mode to insert the one insertion sheet P into the lamination sheet S or the multiple insertion mode to insert the multiple insertion sheets into the lamination sheet S on the control panel 10.

Alternatively, the controller 500 in the sheet processing apparatus 100 may automatically perform the insertion processing based on the above size condition.

As described above, the controller 500 in the sheet processing apparatus 100 according to the present embodiment controls the driver and other parts to perform the insertion processing to insert the insertion sheet P into the lamination sheet S based on the length of the lamination sheet S in the conveyance direction, the length of the insertion sheet P in the conveyance direction, and the number of the insertion sheets P. As a result, the sheet processing apparatus 100 can automatically and suitably insert one or a plurality of insertion sheets P into the lamination sheet S.

In addition, since the configuration of the sheet processing apparatus 100 is simpler than a laminator using a vacuum device, the entire sheet processing apparatus can be simple and compact.

Additionally, as illustrated in FIG. 1, the sheet processing apparatus 100 according to the present embodiment can store the lamination sheets S and insertion sheets P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. Alternatively, the insertion sheet P can be stacked on the sheet tray 102 and the lamination sheet S can be stacked on the sheet feeding tray 103.

Next, descriptions are given of a laminator, an image forming apparatus, and an image forming system including the sheet processing apparatus according to any of embodiments of the present disclosure.

Figure 25:
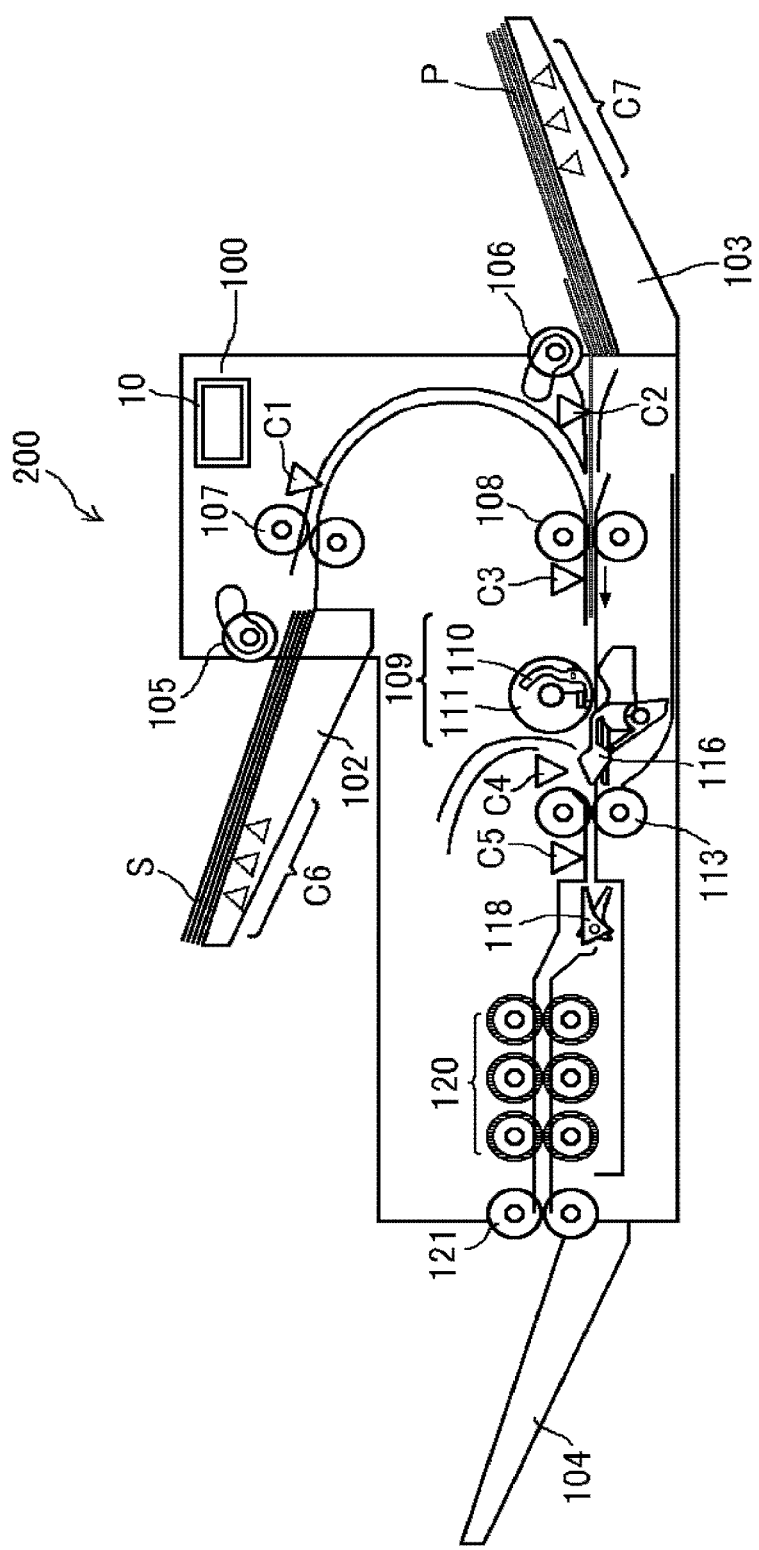
FIG. 25 is a view illustrating an example of general arrangement of a laminator according to one embodiment of the present disclosure, including the sheet processing apparatus illustrated in FIG. 1.

FIG. 25 is a view illustrating an example of general arrangement of the laminator including the sheet processing apparatus according to one embodiment of the present disclosure. As illustrated in FIG. 25, a laminator 200 includes the sheet processing apparatus 100 described above, the bifurcating claw 118 to switch the conveyance route of the lamination sheet S, heat and pressure rollers 120 as a heat and pressure rotator to heat and press the lamination sheet S, and an ejection roller 121 disposed downstream from the heat and pressure rollers 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 26:
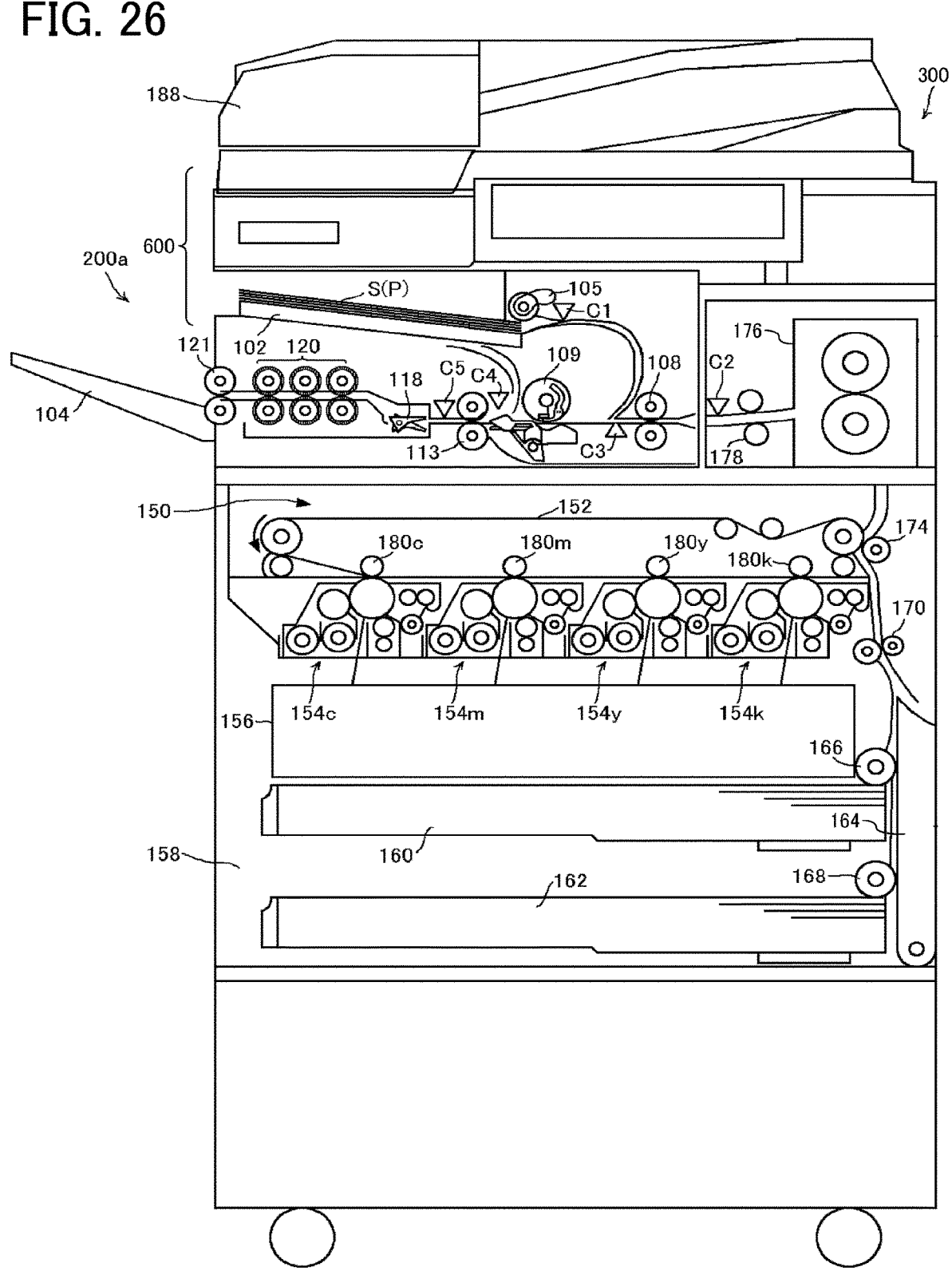
FIG. 26 is a view illustrating an example of an image forming system including an image forming apparatus and the laminator illustrated in FIG. 25.

FIG. 26 is a view illustrating an example of an image forming system including an image forming apparatus and the laminator according to one embodiment of the present disclosure. An image forming system 600 includes an image forming apparatus 300 including a laminator 200a to perform a laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The configuration of the image forming apparatus 300 is described in detail. As illustrated in FIG. 26, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Below the intermediate transfer device 150, image forming devices 154c, 154m, 154y, and 154k for yellow (Y), magenta (M), cyan (C), and black (K) are arranged in a quadruple tandem manner along an extended direction of the intermediate transfer belt 152. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a third tray on which two-ply sheets are stacked, and the second sheet feeding tray 162 is an example of a fourth tray on which sheet media (insertion sheets) are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a third feeder to feed the two-ply sheet from the first sheet feeding tray 160 (the third tray). The second sheet feeding roller 168, the conveyance roller 170, and the sheet feeding passage 164 are examples of a fourth feeder to feed a sheet medium from the second sheet feeding tray 162 (the fourth tray). The intermediate transfer device 150, the fixing device 176, and the like are examples of an image forming device that forms an image on a two-ply sheet or a sheet medium.

Next, a description is given of operations of the image forming system 600 to form an image on the lamination sheet S and then perform lamination according to the present embodiment.

To form an image on the lamination sheet S, first, an image reading device 188 reads a document image, and the exposure device 156 performs image writing. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the insertion sheet P to the sheet feeding passage 164, and the sheet ejection device 178 sends the insertion sheet P to the laminator 200a.

In this way, the lamination sheet S on which the image has been formed and the insertion sheet P are sent to the laminator 200a, and the laminating process is performed. The details of the laminating process have been described above and redundant descriptions are omitted.

With the above-described configuration, the image forming system 600 according to the present embodiment can perform the laminating process with the laminator 200a after image formation on the insertion sheet P. In addition, the image forming system 600 can perform the laminating process after image formation on both the insertion sheet P and the lamination sheet S.

Next, descriptions are given of an image forming apparatus and an image forming system including the sheet processing apparatus, according to a modification of the above-described embodiment.

Figure 27:
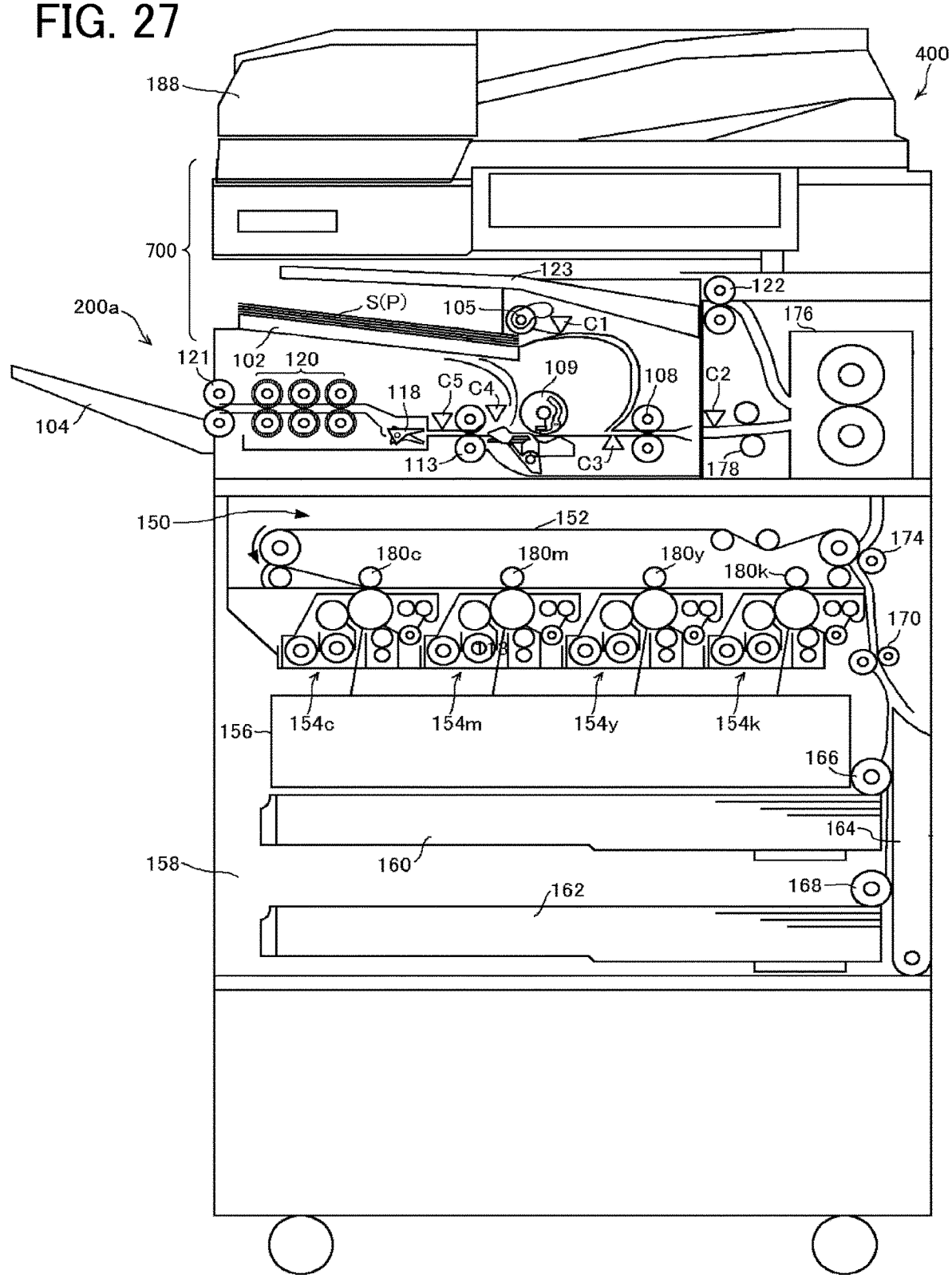
FIG. 27 is a view illustrating a modification of the image forming system including the image forming apparatus and the laminator illustrated in FIG. 25.

FIG. 27 is a view illustrating a modified configuration of the image forming system including the image forming apparatus and the laminator according to the above-described embodiment. Differently from the image forming system 600 illustrated in FIG. 26, an image forming system 700 includes an image forming apparatus 400 including an ejection roller pair 122 and an output tray 123.

When the laminating process is not performed, the image forming apparatus 400 can eject the recording medium on which the image is formed using the ejection roller pair 122 of the main body to the output tray 123 of the main body. Therefore, the image forming apparatus 400 does not slow the image output speed when the laminating process is not performed.

The laminator 200a can be removably installed in the image forming apparatus 400. That is, when the laminating process is unnecessary, the laminator 200a can be removed from the image forming apparatus 400.

In addition, in the laminator 200a thus removed, the sheet feeding tray 103 on which the insertion sheets P are stacked and the pickup roller 106 to feed the insertion sheets P from the sheet feeding tray 103 can be mounted, so that the laminator 200a is used as a stand-alone machine similar to that illustrated in FIG. 25.

The image forming apparatus 300 illustrated in FIG. 26 and the image forming apparatus 400 illustrated in FIG. 27 may include a sheet processing apparatus instead of the laminator. The image forming apparatus 400 illustrated in FIG. 27 may include a sheet processing apparatus that is removably attached thereto.

Further, aspects of this disclosure can be embodied as an image forming system that includes an image forming apparatus and the sheet processing apparatus 100 or the laminator 200 detachably coupled to the image forming apparatus. Furthermore, aspects of this disclosure can be embodied as a system including at least one of a sheet feeder (a stacker) and a case binding device or the like. Note that, in the case where the lamination sheet S is passed through the fixing device 176, the lamination sheet S is not bonded at the fixing temperature but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, stencil printing, or other printing method can be used.

Figures 28, 28A, 28B, 28C:
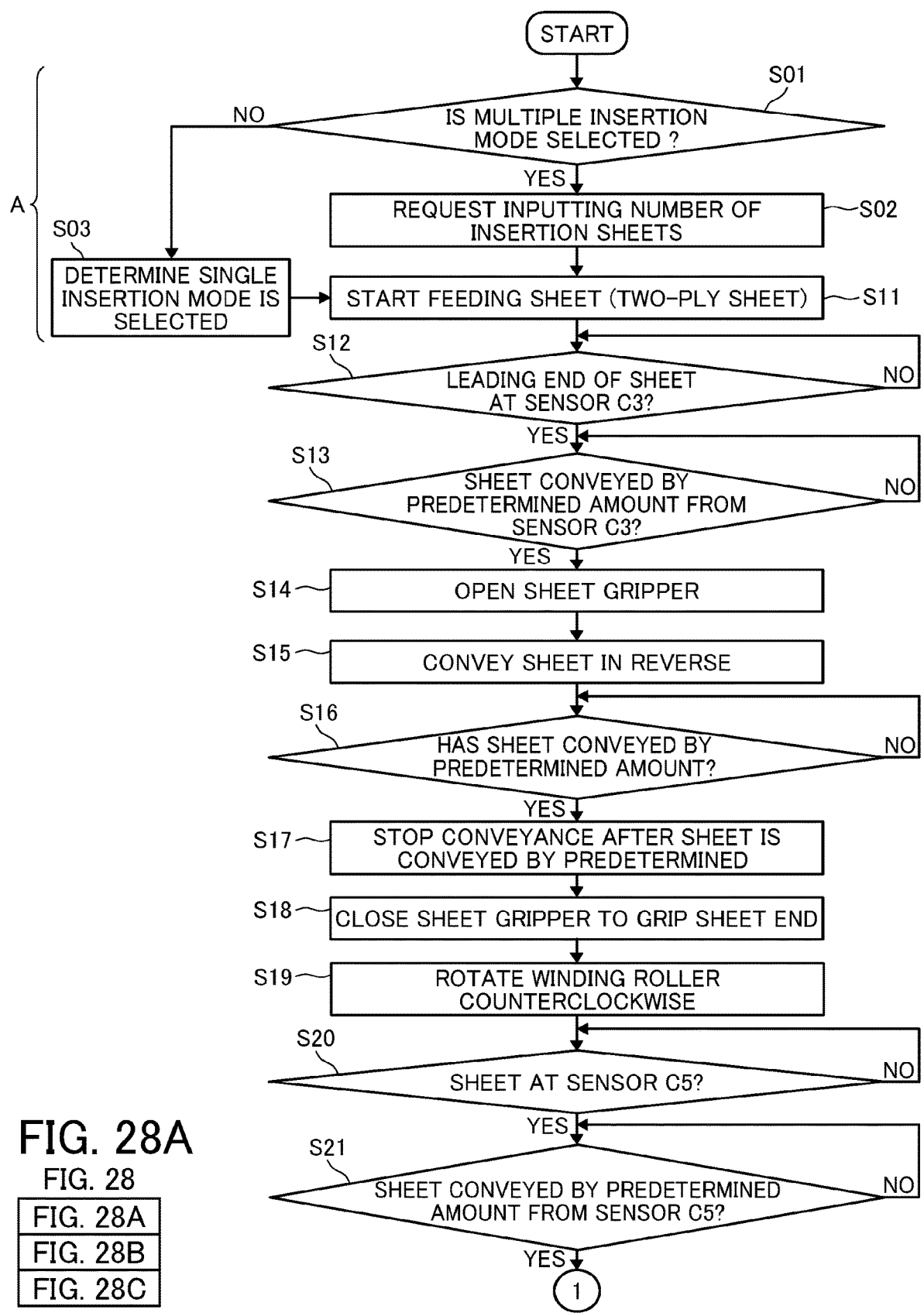
FIG. 28 (FIGS. 28A, 28B, and 28C) is a flowchart illustrating a series of processes from sheet feeding to insertion of the insertion sheet and completion of the laminating process.
Figure 28B:
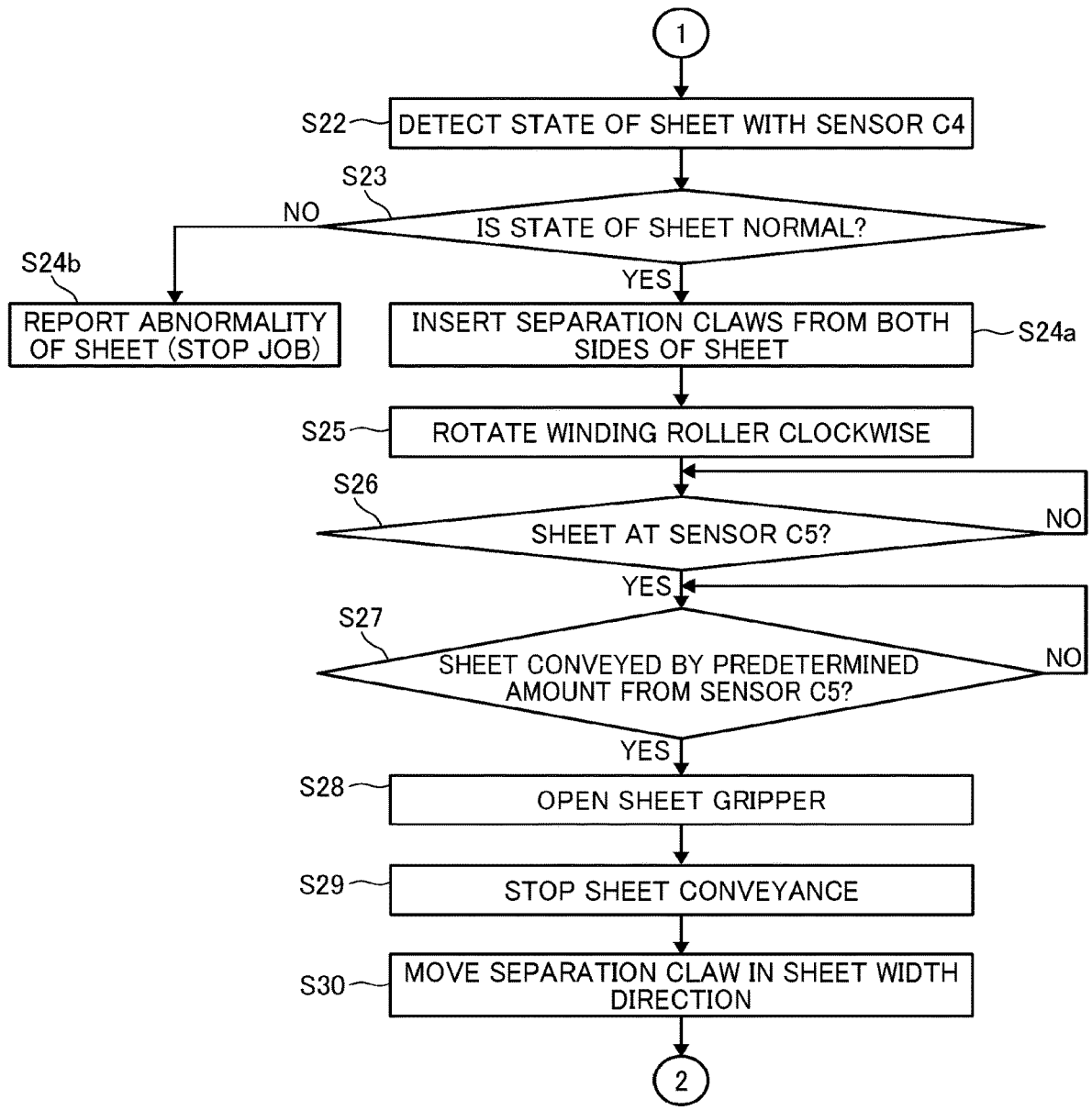
Figure 28C:
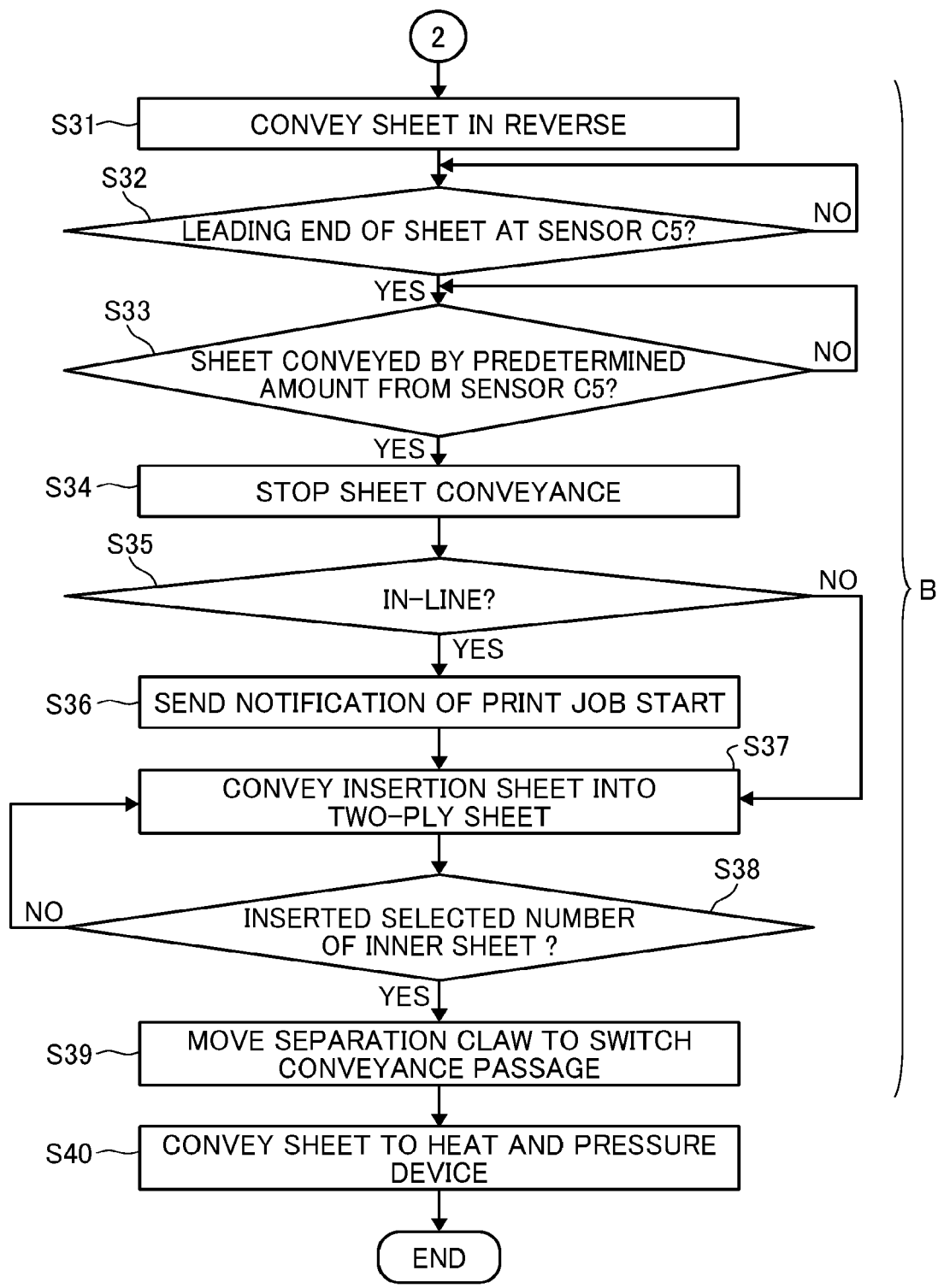

FIG. 28 configured by FIGS. 28A, 28B, and 28C is a flowchart illustrating a series of processes from sheet feeding to insertion of the insertion sheet and completion of the lamination process. The description below proceeds while indicating the reference numerals indicated in the flowchart.

First, in step S01, the controller 500 in the sheet processing apparatus 100 determines whether the user has selected the multiple insertion mode. When the user selects the multiple insertion mode, the controller 500 requests the user inputting the number of insertion sheets in step S02.

That is, the controller 500 controls the control panel 10 to display the operation screen as illustrated in FIG. 24A and request the user setting a lamination film size, the insertion sheet size, and the number of the insertion sheets to be sandwiched.

On the other hand, when the controller 500 determines that the user does not select the multiple insertion mode, the controller 500 in the sheet processing apparatus 100 performs step S03, that is, determines that the user select the single insertion mode.

Next, in step S11, the controller 500 in the sheet processing apparatus 100 controls the driver to start feeding the lamination sheet S (see FIG. 1). In step S12, the controller 500 determines whether the end of the lamination sheet S has arrived at the sheet sensor C3 based on outputs from the sheet sensor C3 (see FIG. 2). In step S13, the controller 500 determines whether the lamination sheet S has been conveyed by the designated amount from the sheet sensor C3, that is, whether a designated time has passed since the sheet sensor C3 detects the end of the lamination sheet S. In response to a determination that the lamination sheet S has been conveyed by the designated amount from the sheet sensor C3 (Yes in step S13), the controller 500 in the sheet processing apparatus 100 controls the driver to temporarily stop the sheet conveyance (see FIG. 3). For example, the "designated amount" used here and those in subsequent processes are stored in a memory by a manufacturer based on empirical data. Subsequently, the controller 500 controls the driver to open the sheet gripper 110 in step S14 and convey the lamination sheet S in the reverse conveyance direction in step S15 (see FIG. 4).

In step S16, the controller 500 in the sheet processing apparatus 100 determines whether the lamination sheet S has been conveyed by a designated amount. In response to a determination that the lamination sheet S has been conveyed by the designated amount (Yes in step S16), the controller 500 controls the driver to temporarily stop the sheet conveyance in step S17. In step S18, the controller 500 controls the driver to close the sheet gripper 110 to grip the end of the lamination sheet S (see FIG. 5).

In step S19, the controller 500 in the sheet processing apparatus 100 controls the driver to rotate the winding roller 109 counterclockwise (in reverse) and wind the lamination sheet S around the winding roller 109 (see FIG. 6). In step S20, the controller 500 determines whether the leading end of the lamination sheet S has arrived at the sheet sensor C5. In step S21, the controller 500 in the sheet processing apparatus 100 determines whether the lamination sheet S is conveyed by the designated amount from the sheet sensor C5. In response to a determination that the lamination sheet S has been conveyed by the designated amount from the sheet sensor C5 (Yes in step S21), the controller 500 determines whether the state of the lamination sheet S is normal using detection results of the abnormality detector C4 in step S22.

The abnormality detector C4 detects the size of the gap between the two sheets of the lamination sheet S for the sheet processing apparatus 100 to determine whether or not the size of the gap exceeds a threshold. In step S23, the controller 500 in the sheet processing apparatus 100 determines whether the state of the lamination sheet is normal, that is, whether the size of the gap is equal to or greater than the threshold based on the detection result of the abnormality detector C4. In response to a determination that the state of the lamination sheet S is normal, the controller 500 proceeds to step S24a.

On the other hand, in response to a determination in step S23 that the state of the lamination sheet S is abnormal (the size of the gap is smaller than the threshold), the controller 500 in the sheet processing apparatus 100 controls the control panel 10 to display the abnormality (e.g., displays an error message) and stops the sheet processing (a job) in step S24b.

In step S24a, the controller 500 in the sheet processing apparatus 100 controls the driver to insert, from both sides, the separation claws 116 into the gap between the sheets of the lamination sheet S (see FIG. 7). In step S25, the controller 500 in the sheet processing apparatus 100 controls the driver to rotate the winding roller 109 clockwise (forward direction) with the separation claws 116 inserted from both sides of the lamination sheet S, and convey the lamination sheet S in the forward conveyance direction.

In step S26, the controller 500 determines whether the leading end of the lamination sheet S has arrived at the sheet sensor C5. In response to a determination that the lamination sheet S has been conveyed by the designated amount from the sheet sensor C5 (Yes in S27), the controller 500 in the sheet processing apparatus 100 controls the driver to open the sheet gripper 110 in step S28.

In step S29, the controller 500 in the sheet processing apparatus 100 controls the driver to temporarily stop the conveyance of the lamination sheet S and, in step S30, move the separation claws 116 further in the sheet width direction (see FIG. 8). As a result, the rear end portion of the lamination sheet S in the forward conveyance direction is separated into the upper and lower sheets.

In step S31, the controller 500 in the sheet processing apparatus 100 controls the driver to convey the lamination sheet S in the reverse conveyance direction. In step S32, the controller 500 determines whether the leading end of the lamination sheet S in the forward conveyance direction has arrived at the sheet sensor C5. In step S33, the controller 500 in the sheet processing apparatus 100 determines whether the lamination sheet S is conveyed by the designated amount after the sheet sensor C5 detects the leading end of the lamination sheet S. In response to a determination that the lamination sheet S has been conveyed by the designated amount from the sheet sensor C5 (Yes in step S33), the controller 500 suspends the sheet conveyance in step S34 (see FIG. 9). As a result, the separation of the lamination sheet S is completed.

Subsequently, in step S35, the controller 500 in the sheet processing apparatus 100 determines whether or not to perform image formation (with an in-line image forming apparatus) on the insertion sheet P to be inserted into the lamination sheet S. In the case of in-line image formation (Yes in step S35), the controller 500 in the sheet processing apparatus 100 sends a signal to the in-line image forming apparatus to start a print job to form an image on the insertion sheet P in step S36. Then, the controller 500 proceeds to step S37.

On the other hand, when in-line image formation is not performed (No in step S35), the controller 500 proceeds to step S37.

In step S37, the controller 500 in the sheet processing apparatus 100 controls the driver to convey the insertion sheet P in the forward conveyance direction to be inserted in the opening of the lamination sheet S. In step S37, when the controller 500 performs the single insertion mode, the sheet processing apparatus 100 performs operations as illustrated in FIGS. 11 to 13, and when the controller 500 performs the multiple insertion mode, the sheet processing apparatus 100 performs operations as illustrated in FIGS. 14 to 17.

In step S38, the controller 500 in the sheet processing apparatus 100 determines whether the selected number of insertion sheets P are inserted into the lamination sheet S. After the insertion sheets P are inserted, the controller 500 proceeds to step S39.

In step S39, the controller 500 controls the driver to rotate the bifurcating claw 118 to switch the route. In step S40, the lamination sheet S sandwiching the insertion sheet P is conveyed to the heat and pressure device and heated and pressed to complete the lamination process (see FIG. 18).

In the case of in-line image formation (Yes in step S35), the controller 500 sends the image forming apparatus the signal to start the print job after the sheet processing apparatus 100 completes separating the lamination sheet S, and the image forming apparatus prints an image on the insertion sheet P and conveys the insertion sheet P to the sheet processing apparatus. In this case, the sheet processing apparatus waits until the printed insertion sheet P is conveyed and reaches the sheet sensor C1. The controller 500 may send the image forming apparatus the signal to start the print job in advance based on a time to convey the printed insertion sheet P, for example, after the separation claws 116 completes operations illustrated in FIG. 7. This can improve productivity.

Figures 29, 29A:
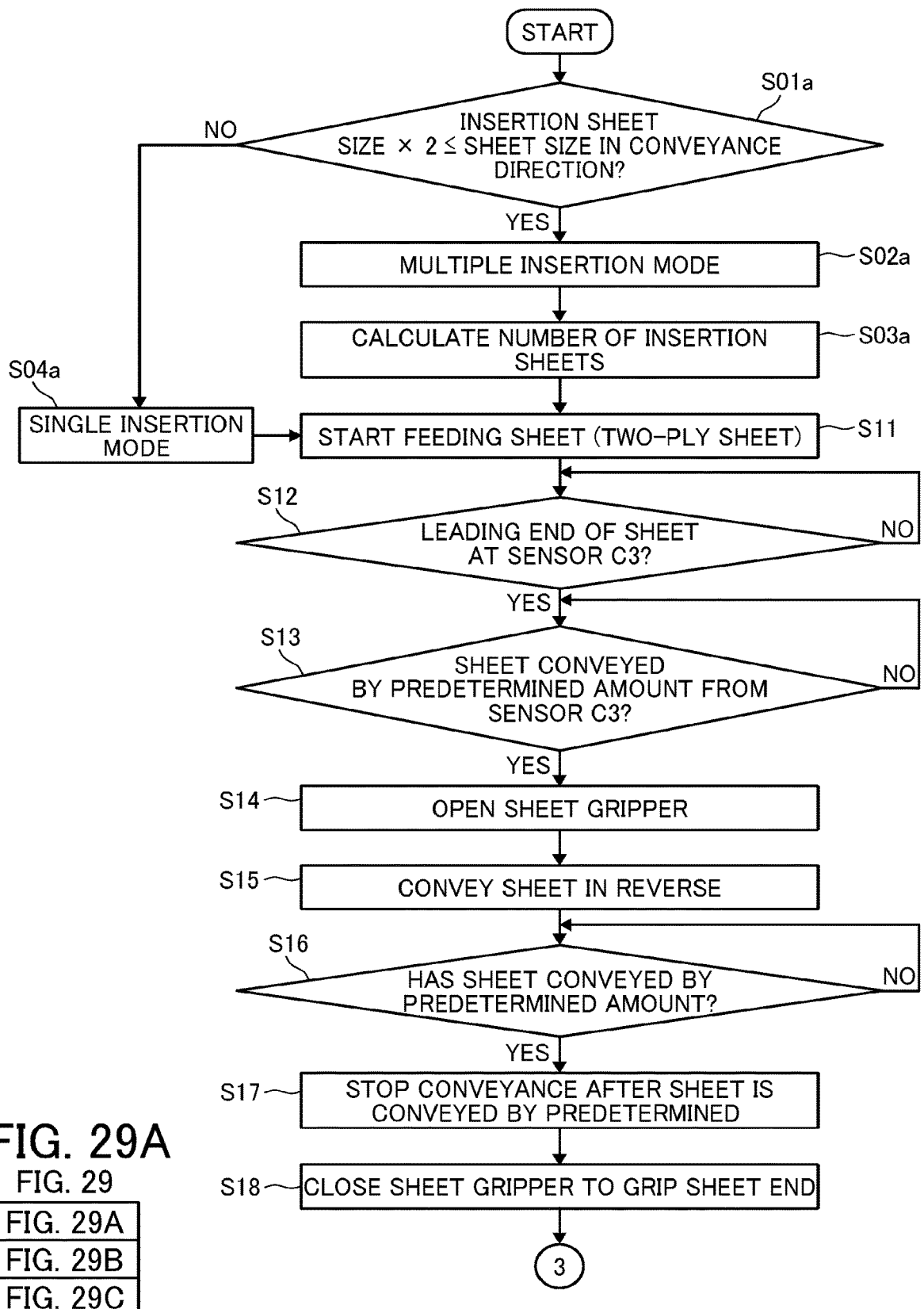
FIG. 29 (FIGS. 29A, 29B, and 29C) is another flowchart illustrating a series of processes from sheet feeding to insertion of the insertion sheet and completion of the laminating process.
Figure 29B:
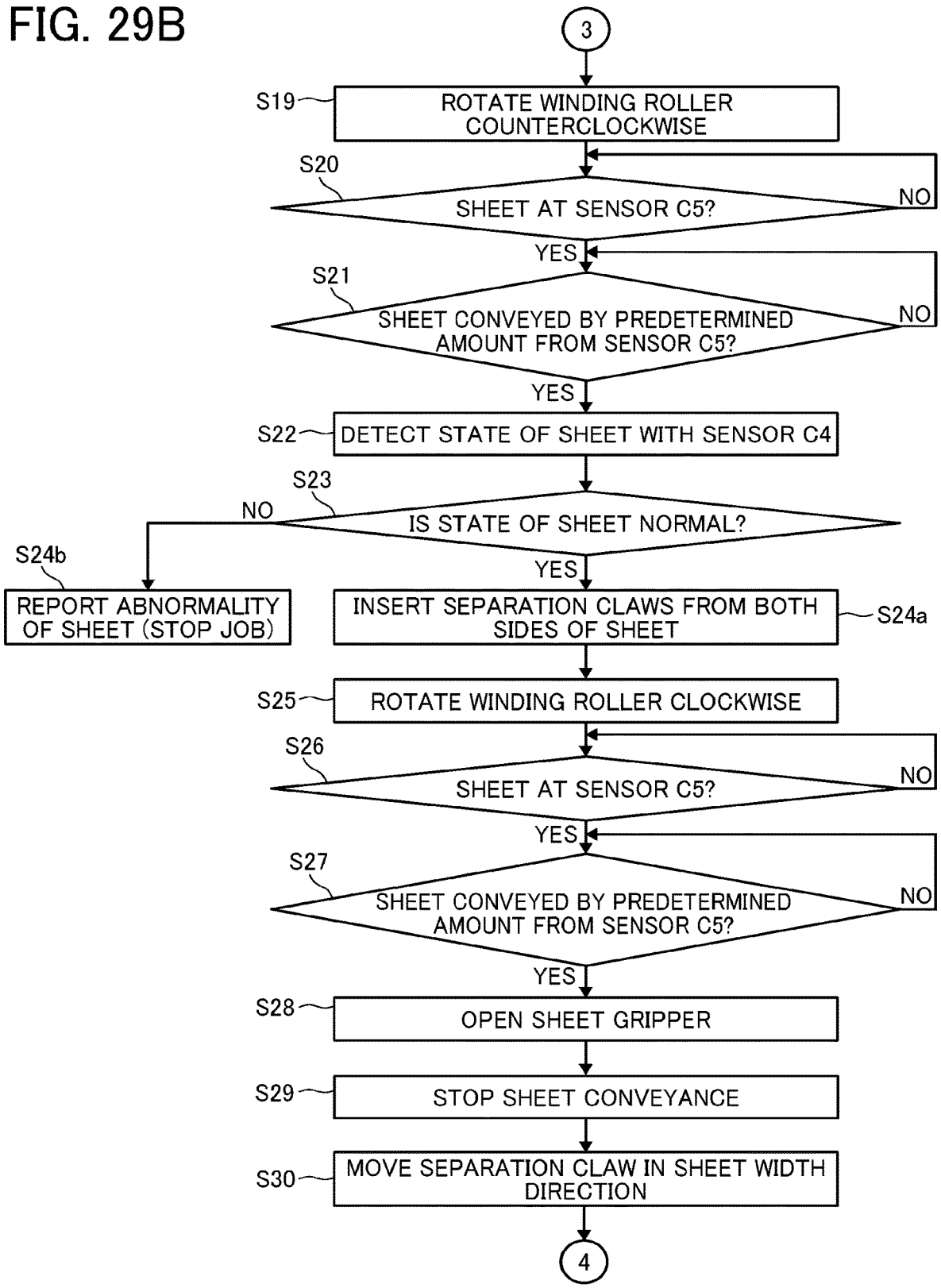

FIG. 29 configured by FIGS. 29A, 29B, and 29C is another flowchart illustrating a series of processes from sheet feeding to insertion of the insertion sheet and completion of the laminating process. The description below proceeds while indicating the reference numerals indicated in the flowchart.

First, in step S01a, the controller 500 in the sheet processing apparatus 100 obtains the length of the lamination sheet S and the length of the insertion sheet P in the conveyance direction from the size detector for the sheet and the size detector for the medium. The controller 500 determines whether the length of the insertion sheet P in the conveyance direction is equal to or smaller than half the length of the lamination sheet S in the conveyance direction.

In response to a determination that the length of the insertion sheet P in the conveyance direction is equal to or smaller than half the length of the lamination sheet S in the conveyance direction (Yes in step S01a), the controller 500 in the sheet processing apparatus 100 starts the multiple insertion mode in step S02a. In step S03a, the controller 500 calculates the number of insertion sheets P from the quotient of the size of the lamination sheet S and the size of the insertion sheet P.

On the other hand, in response to a determination that the length of the insertion sheet P in the conveyance direction is larger than half the length of the lamination sheet S in the conveyance direction (No in step S01a), the controller 500 in the sheet processing apparatus 100 starts the single insertion mode.

Since subsequent steps from step S11 are the same as that in the flowchart of FIG. 28, the description thereof is omitted.

The following describes another aspect of the present disclosure.

The sheet processing apparatus 100 of the present embodiment is characterized in that the relative position of the insertion sheet P with respect to the lamination sheet S can be adjusted.

Figure 30:
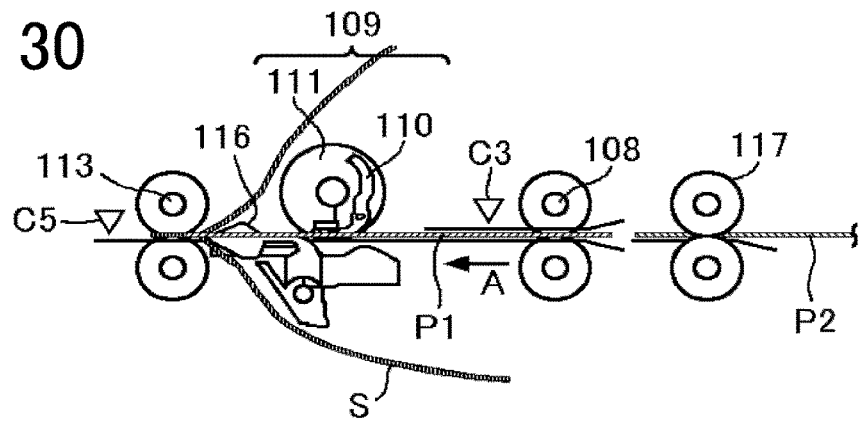
FIG. 30 is a view illustrating a first positioning control to adjust a relative position of a first insertion sheet P1 with respect to the lamination sheet S.
Figure 31:
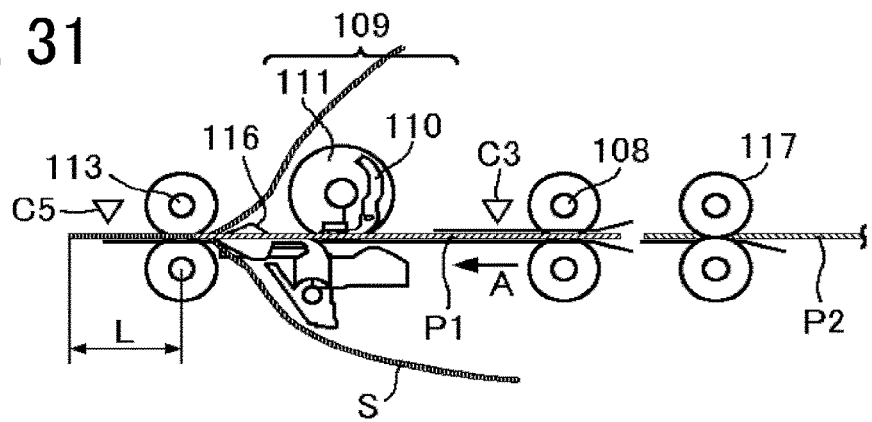
FIG. 31 is a view illustrating a second positioning control to adjust the relative position of the first insertion sheet P1 with respect to the lamination sheet S.
Figure 32A:
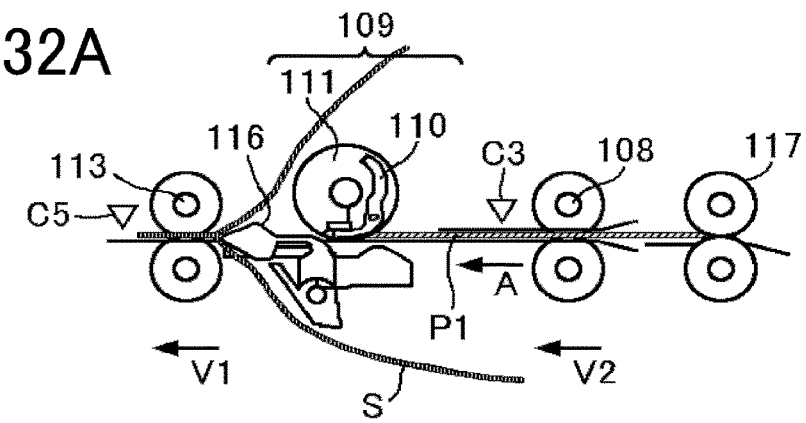
FIGS. 32A and 32B are views illustrating a third positioning control to adjust the relative position of the first insertion sheet P1 with respect to the lamination sheet S.
Figure 32B:
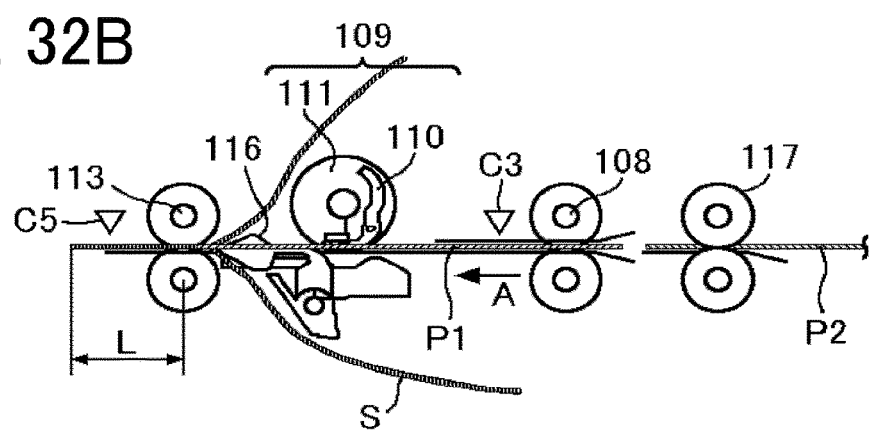
Figure 33A:
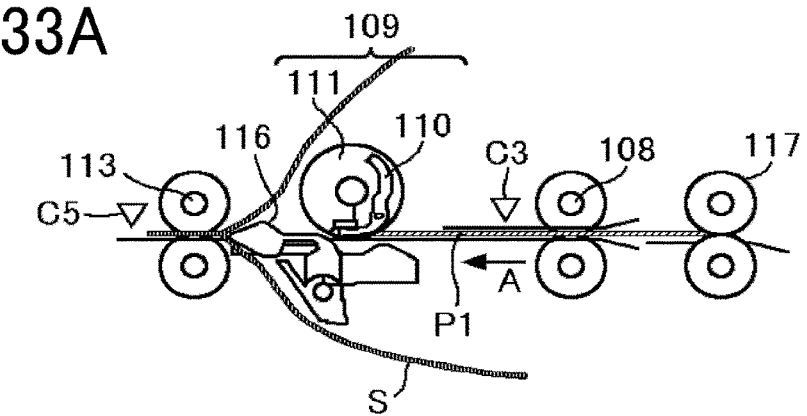
FIGS. 33A and 33B are views illustrating a fourth positioning control to adjust the relative position of the first insertion sheet P1 with respect to the lamination sheet S.
Figure 33B:
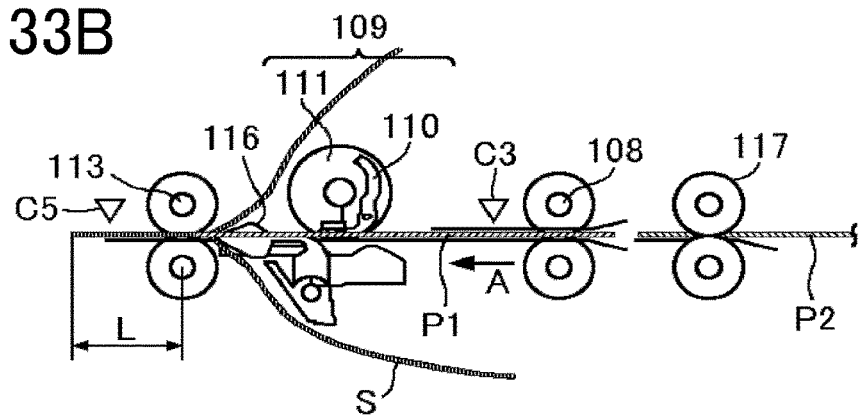

Specifically, when the first insertion sheet is inserted into the lamination sheet S, the controller 500 may perform four types of positioning control. A first positioning control uses abutting the insertion sheet to the bonded portion of the lamination sheet S (FIG. 30). A second positioning control uses adjusting a protruding amount of the lamination sheet S from the nip of the exit roller pair 113 (FIG. 31). A third positioning control uses adjusting the linear velocity difference in conveyance of the insertion sheet and the lamination sheet (FIGS. 32A and 32B). A fourth positioning control uses a control of the merging timing (FIGS. 33A and 33B).

The following describes each positioning control in the above-described order.

In the first positioning control, the insertion sheet P1 is abutted to the bonded portion of the lamination sheet S. As illustrated in FIG. 30, when the insertion sheet P1 and the lamination sheet S converge in the sheet processing apparatus 100, the exit roller pair 113 nips the bonded portion of the lamination sheet S opening toward the conveyance direction of the insertion sheet P1. In the above-described state, abutting the insertion sheet P1 to the bonded portion of the lamination sheet S positions the insertion sheet P1.

In the second positioning control, the controller 500 adjusts the protruding amount of the lamination sheet S from the nip of the exit roller pair 113. As illustrated in FIG. 31, the controller 500 in the sheet processing apparatus 100 controls the driver to rotate the exit roller pair 113 and cause the leading end of the lamination sheet S in the conveyance direction to protrude from the nip of the exit roller pair 113 by the protruding amount L. The controller 500 can adjust the protruding amount L based on detection results of the sheet sensor C5. Abutting the insertion sheet P1 to the nip of the exit roller pair 113 positions the insertion sheet P1 with respect to the lamination sheet S.

The above-described control can arbitrarily adjust a distance between the leading end of the lamination sheet S in the conveyance direction and the leading end of the insertion sheet P1 in the conveyance direction and adjust the relative position between the lamination sheet S and the insertion sheet P1. In addition, abutting the insertion sheet P1 to the nip of the exit roller pair 113 can correct an inclination of the insertion sheet P1.

In the third positioning control, the controller 500 adjusts a linear velocity difference between the exit roller pair 113 and the entrance roller pair 108. As illustrated in FIG. 32A, after the separation of the lamination sheet S is completed, the controller 500 in the sheet processing apparatus 100 controls the drivers to set the linear speed V1 of the exit roller pair 113 that holds and conveys the separated lamination sheet S smaller than the linear speed V2 of the entrance roller pair 108 that conveys the insertion sheet P1, that is, V1<V2. Then, as illustrated in FIG. 32 B, abutting the insertion sheet P1 to the nip of the exit roller pair 113 at a timing calculated so as to set a positional relation between the bonded portion of the lamination sheet S and the insertion sheet P1 positions the insertion sheet P1 with respect to the lamination sheet S.

The above control can adjust the relative position of the insertion sheet P1 with respect to the lamination sheet S and improve productivity because both the exit roller pair 113 and the entrance roller pair 108 do not stop.

In the fourth positioning control, the controller 500 controls a converge timing at which the insertion sheet P1 and the lamination sheet S converge. As illustrated in FIGS. 33A and 33B, after the separation of the sheet S is completed, the controller 500 in the sheet processing apparatus 100 controls the converge timing at which the exit roller pair 113 holding the separated sheet S starts to convey the lamination sheet S so that the insertion sheet P1 and the lamination sheet S converge at a desired relative position.

That is, as illustrated in FIG. 33A, the controller 500 controls the rotations of the exit roller pair 113 to start conveying the lamination sheet S before the insertion sheet P1 reaches the nip of the exit roller pair 113. Then, as illustrated in FIG. 33B, the controller 500 controls rotations of the exit roller pair 113 and the entrance roller pair 108 so that the insertion sheet P1 and the lamination sheet S converge at the converge timing at which the insertion sheet P1 is at a desired relative position with respect to the lamination sheet S.

The above-described control can adjust the relative position of the insertion sheet P1 with respect to the lamination sheet S without abutting the insertion sheet P1 to the nip of the exit roller pair 113 or the lamination sheet S.

Figure 34:
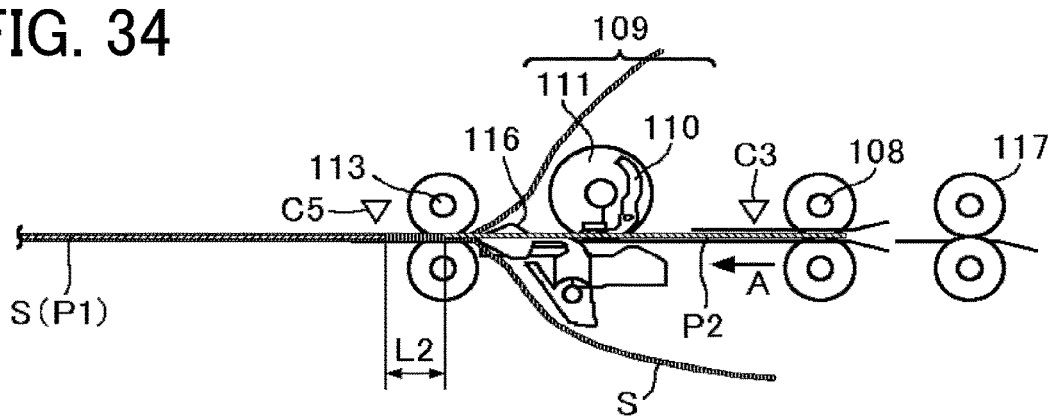
FIG. 34 is a view illustrating a first positioning control to adjust a relative position of a second insertion sheet P2 with respect to the lamination sheet S.

Subsequently, when the second insertion sheet P2 is inserted into the lamination sheet S, the controller 500 may perform three types of positioning control. A first positioning control uses abutting the insertion sheet P2 to the nip of the exit roller pair (FIG. 34). A second positioning control uses adjusting the linear velocity difference in conveyance of the insertion sheet P2 and the lamination sheet S (FIG. 35). A third positioning control uses a control of the converge timing (FIG. 36).

In the first positioning control, the controller 500 positions the insertion sheet P2 by abutting the insertion sheet P2 to the nip of the exit roller pair 113. As illustrated in FIG. 34, the controller 500 in the sheet processing apparatus 100 adjusts a distance L2 between the rear end of the first insertion sheet P1 and the leading end of the second insertion sheet P2 in the conveyance direction that is also referred to as the protruding amount L2 of the lamination sheet S from the nip of the exit roller pair 113 in the conveyance direction based on detection results of the sheet sensor C5. Abutting the insertion sheet P2 to the nip of the exit roller pair 113 positions the insertion sheet P2 with respect to the lamination sheet S.

Figure 35A:
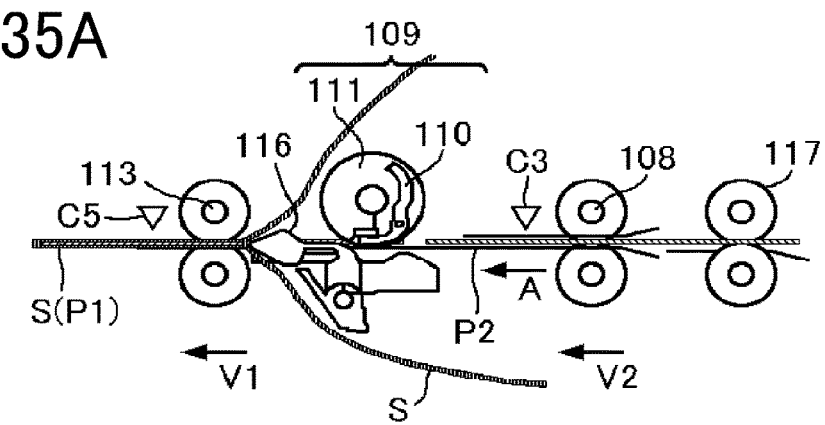
FIGS. 35A and 35B are views illustrating a second positioning control to adjust the relative position of the second insertion sheet P2 with respect to the lamination sheet S.
Figure 35B:
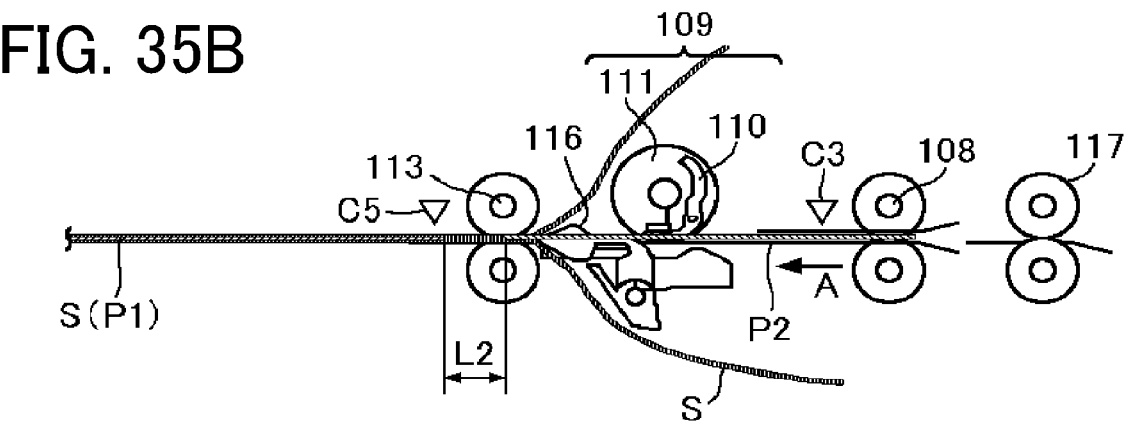

In the second positioning control, the controller 500 adjusts the linear velocity difference between the exit roller pair 113 and the entrance roller pair 108. As illustrated in FIG. 35A, after the separation of the lamination sheet S is completed, the controller 500 in the sheet processing apparatus 100 controls the drivers to set the linear velocity V1 of the exit roller pair 113 that holds and conveys the separated lamination sheet S smaller than the linear velocity V2 of the entrance roller pair 108 that conveys the insertion sheet P2, that is, V1<V2. Then, as illustrated in FIG. 35B, abutting the insertion sheet P2 to the nip of the exit roller pair 113 at a timing calculated so as to set a positional relation between the rear end of the first insertion sheet S and the second insertion sheet P2 positions the insertion sheet P2 with respect to the lamination sheet S.

Figure 36A:
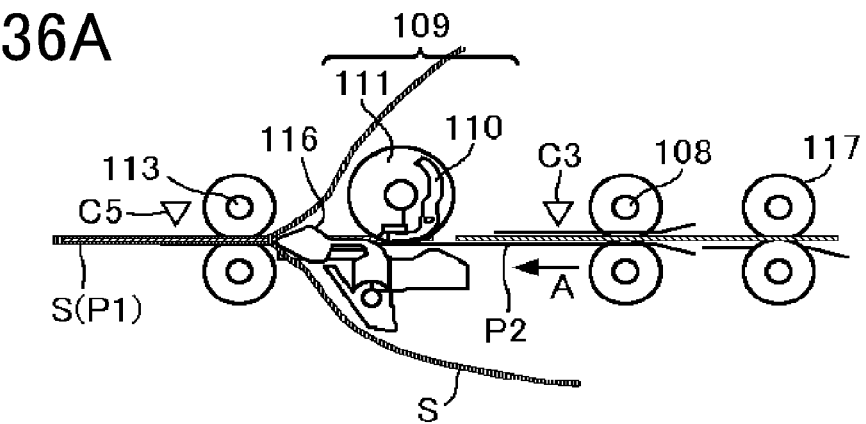
FIGS. 36A and 36B are views illustrating a third positioning control to adjust the relative position of the second insertion sheet P2 with respect to the lamination sheet S.
Figure 36B:
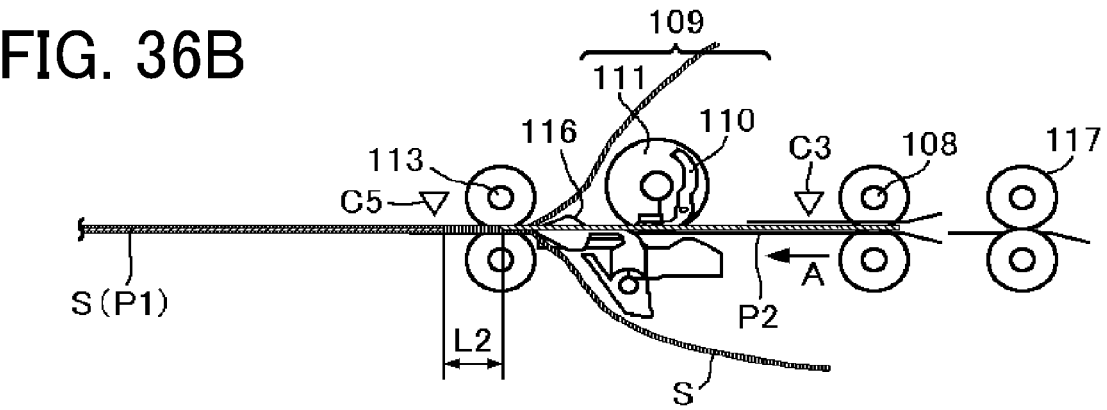

In the third positioning control, the controller 500 controls a converge timing at which the second insertion sheet P2 and the lamination sheet S converge. As illustrated in FIG. 36A, before the second insertion sheet P2 reaches the nip of the exit roller pair 113, the controller 500 controls rotations of the exit roller pair 113 to convey the lamination sheet S sandwiching the first insertion sheet P1 toward the output tray 104. Subsequently, as illustrated in FIG. 36B, the controller 500 controls rotations of the exit roller pair 113 and the entrance roller pair 108 so that the second insertion sheet P2 and the lamination sheet S converge at a converge timing at which the insertion sheet P2 is positioned with respect to the rear end of the first insertion sheet P1. The above-described control can adjust the relative position of the second insertion sheet P2 with respect to the lamination sheet S without abutting the second insertion sheet P2 to the nip of the exit roller pair 113 or the lamination sheet S.

Figure 37:
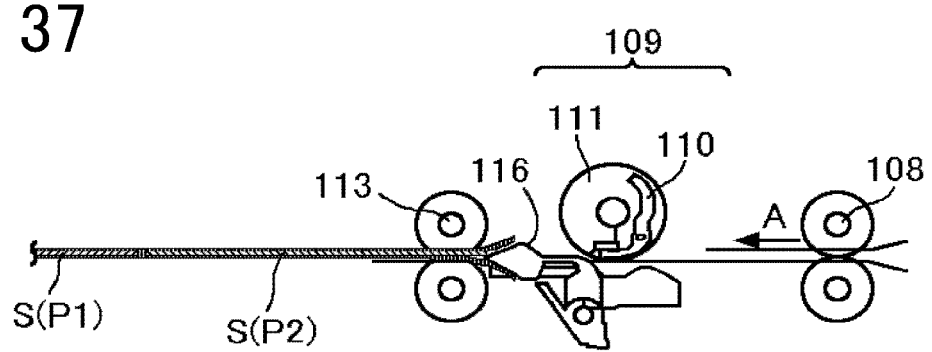
FIG. 37 is a view illustrating completion of adjusting the relative positions of the insertion sheets P1 and P2 with respect to the lamination sheet S.

After the second insertion sheet P2 is inserted into the lamination sheet S, the exit roller pair 113 nips and conveys the lamination sheet S sandwiching the second insertion sheet P2 as illustrated in FIG. 37. Thus, the controller 500 completes the multiple insertion mode. The controller 500 is configured to be able to adjust setting of the relative positions of the insertion sheets within a range in which the rear end of the final insertion sheet P does not protrude from the rear end of the lamination sheet S.

Figure 38A:
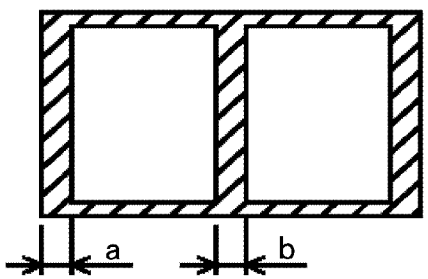
FIGS. 38A and 38B are views illustrating examples of the operation screen displayed on the control panel of the sheet processing apparatus illustrated in FIG. 1 to set a relative position of the insertion sheet.

FIG. 38A is an example of an operation screen for setting the relative positions of the insertion sheets displayed on the control panel of the sheet processing apparatus illustrated in FIG. 1. As illustrated in FIG. 38A, the user can set a length a that is a distance between an end of the lamination sheet and a leading end of the insertion sheet and a length b that is a relative distance of the insertion sheets on the operation screen. The user can adjust the lengths when the total sum of the distance between the end of the lamination sheet and the leading end of the insertion sheet, the relative distance of the insertion sheets, and the sum of the lengths of the insertion sheets P in the conveyance direction is equal to or smaller than the length of the lamination sheet S in the conveyance direction.

Figure 38B:

However, when the above-described total sum is larger than the length of the lamination sheet S in the conveyance direction, the controller 500 in the sheet processing apparatus 100 determines that the input data are wrong, that is, abnormality. As illustrated in FIG. 38B, the controller 500 controls the control panel 10 to display an error message and prompt the user to select and input the lengths described above again.

As described above, the controller 500 in the sheet processing apparatus 100 according to the present embodiment controls the driver and other parts to perform the insertion processing to insert the insertion sheets P into the lamination sheet S based on the length of the lamination sheet S in the conveyance direction, the lengths of the insertion sheets P in the conveyance direction, and the number of the insertion sheets P. As a result, the relative position of the insertion sheet P2 with respect to the lamination sheet S is adjusted, and the sheet processing apparatus 100 can automatically insert one or a plurality of insertion sheets P into the lamination sheet S.

Figures 39, 39A:
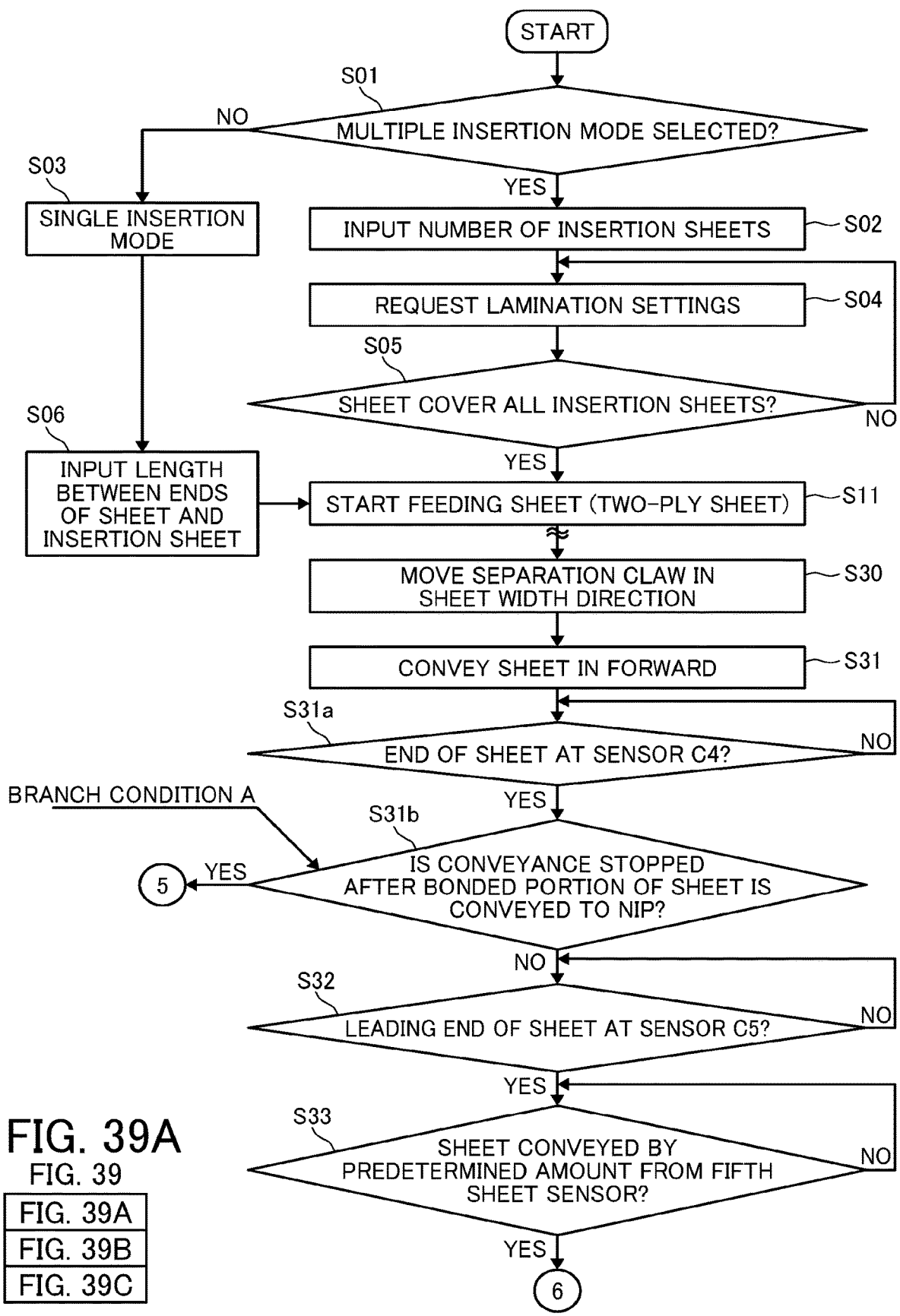
FIG. 39 (FIGS. 39A, 39B, and 39C) is a still another flowchart illustrating a series of processes from sheet feeding to insertion of the insertion sheet and completion of the laminating process.
Figure 39B:
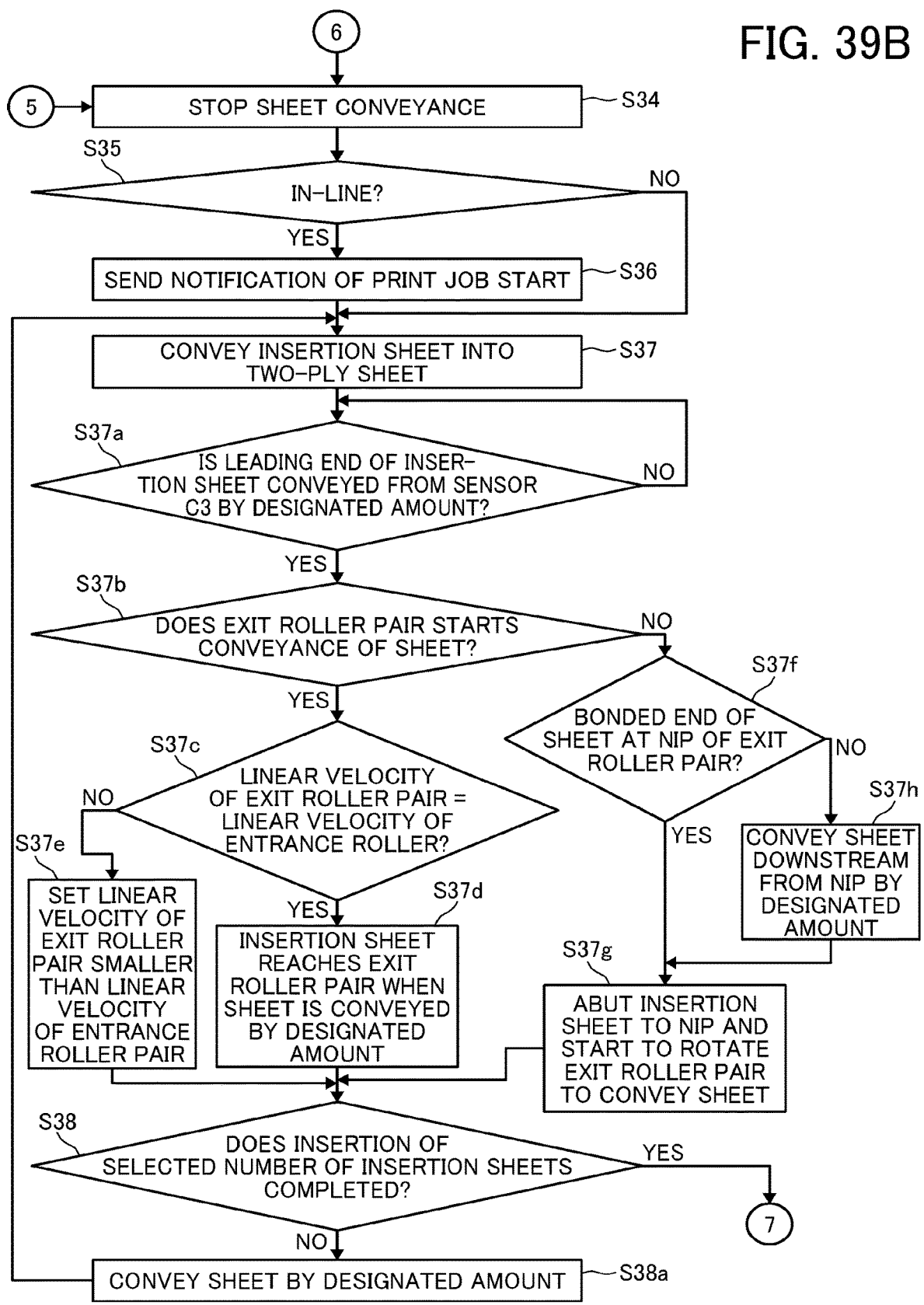
Figure 39C:
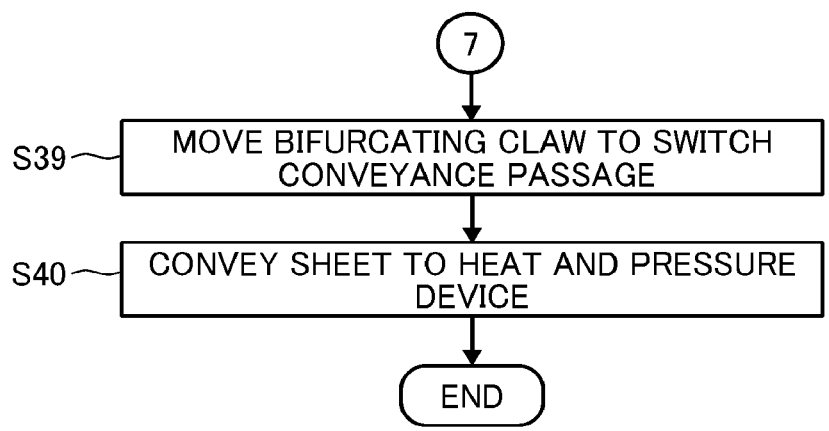

Next, with reference to a flowchart of FIG. 39, a characteristic part of the present embodiment is described below. FIG. 39 corresponds to parts A and B in FIG. 28. FIG. 39 omits control steps corresponding to a part other than the parts A and B in FIG. 28 because they are the same as the steps in FIG. 28.

Firstly, a part in FIG. 39 corresponding to the part A in FIG. 28 is described. In step S01, the controller 500 in the sheet processing apparatus 100 determines whether the user has selected the multiple insertion mode. When the user selects the multiple insertion mode, the controller 500 requests the user inputting the number of insertion sheets in step S02.

Next, in step S04, the controller 500 controls the control panel 10 to display the operation screen as illustrated in FIG. 38A and requests the user inputting the length a that is the distance between the end of the lamination sheet and the leading end of the insertion sheet and the length b that is the relative distance of the insertion sheets.

In step S05, the controller 500 in the sheet processing apparatus 100 determines whether the total sum of the distance between the end of the lamination sheet and the leading end of the insertion sheet, the relative distance of the insertion sheets, and the sum of the lengths of the insertion sheets P in the conveyance direction is equal to or smaller than the length of the lamination sheet S in the conveyance direction. That is, the controller 500 determines whether the lamination sheet S can cover all insertion sheets. In response to a determination that the total sum of the distance between the end of the lamination sheet and the leading end of the insertion sheet, the relative distance of the insertion sheets, and the sum of the lengths of the insertion sheets P in the conveyance direction is equal to or smaller than the length of the lamination sheet S in the conveyance direction (Yes in step S05), the controller 500 starts feeding the lamination sheet S in step S11. On the other hand, in response to a determination that the total sum of the distance between the end of the lamination sheet and the leading end of the insertion sheet, the relative distance of the insertion sheets, and the sum of the lengths of the insertion sheets P in the conveyance direction is larger than the length of the lamination sheet S in the conveyance direction (No in step S05), the controller 500 in the sheet processing apparatus 100 controls the control panel to display the error message as illustrated in FIG. 38B and returns to step S04 to request the user selecting and inputting the lengths described above.

In step S01, when the controller 500 determines that the user does not select the multiple insertion mode, the controller 500 in the sheet processing apparatus 100 performs step S03, that is, determines that the user select the single insertion mode. Next, in step S06, the controller 500 requests the user setting the length a that is the distance between the end of the lamination sheet and the leading end of the insertion sheet on the control panel 10. Thereafter, the controller 500 starts feeding the lamination sheet S in step S11.

Next, a part in FIG. 39 corresponding to the part B in FIG. 28 is described. In step S31, the controller 500 in the sheet processing apparatus 100 controls the driver to convey the lamination sheet S in the reverse conveyance direction. In step S31a, the controller 500 determines whether the front end of the lamination sheet S in the reverse conveyance direction has arrived at the sheet sensor C4. Next, in step S31b, the controller 500 in the sheet processing apparatus 100 determines whether to stop the conveyance after conveying the bonded end of the lamination sheet S to the nip of the exit roller pair 113.

When the controller 500 determines not stopping the conveyance (No in step S31b), the controller 500 in the sheet processing apparatus 100 determines whether the leading end of the lamination sheet S in the forward conveyance direction has arrived at the sheet sensor C5 in step S32. In step S33, the controller 500 in the sheet processing apparatus 100 determines whether the lamination sheet S is conveyed by the designated amount after the sheet sensor C5 detects the leading end of the lamination sheet S. In response to a determination that the lamination sheet S has been conveyed by the designated amount from the sheet sensor C5 (Yes in step S33), the controller 500 temporarily stops the sheet conveyance in step S34.

On the other hand, when the controller 500 determines stopping the conveyance (Yes in step S31b), the controller 500 controls the driver to temporally stop the conveyance of the lamination sheet S and completes separating the lamination sheet S in step S34. The step S31b is defined as a branch condition A.

In step S37, the controller 500 in the sheet processing apparatus 100 controls the driver to convey the insertion sheet P in the forward conveyance direction to be inserted in the opening of the lamination sheet S. In step S37a, the controller 500 determines whether the insertion sheet P is conveyed from the sheet sensor C3 by a designated amount. In response to a determination that the insertion sheet P has been conveyed by the predetermined amount from the sheet sensor C3 (Yes in S37a), the controller 500 in the sheet processing apparatus 100 determines whether the exit roller pair 113 starts the conveyance of the lamination sheet S in step S37b.

In response to a determination that the exit roller pair 113 starts the conveyance of the lamination sheet S (Yes in step S37b), the controller 500 in the sheet processing apparatus 100 determines whether the linear velocity (V1) of the exit roller pair 113 is set to be equal to the linear velocity (V2) of the entrance roller pair 108 in step S37c. In response to a determination that the linear velocity (V1) of the exit roller pair 113 is set to be equal to the linear velocity (V2) of the entrance roller pair 108 (Yes in step S37c), the controller 500 continues conveying the lamination sheet S and the insertion sheet P, the insertion sheet P reaches the exit roller pair 113 at the timing at which the lamination sheet is conveyed by a designated amount, and the lamination sheet S and the insertion sheet P converge as described in the positioning control using the converge timing with reference to FIGS. 33A and 33B, or 36A and 36B in step S37d.

On the other hand, in response to a determination that the linear velocity (V1) of the exit roller pair 113 is not set to be equal to the linear velocity (V2) of the entrance roller pair 108 (No in step S37c), the controller 500 sets the linear velocity (V1) of the exit roller pair 113 to be smaller than the linear velocity (V2) of the entrance roller pair 108 in step S37e to position the insertion sheet P with respect to the lamination sheet S as described in the positioning control using the linear velocity difference with reference to FIGS. 32A and 33B or 35A and 35B.

Returning to the previous step S37b, in response to a determination that the exit roller pair 113 does not start the conveyance of the lamination sheet S (No in step S37b), the controller 500 in the sheet processing apparatus 100 determines whether the bonded portion of the lamination sheet S is in the nip of the exit roller pair 113 in step S37f1 This is determined by the branch condition A described above.

In response to a determination that the bonded portion of the lamination sheet S is in the nip (Yes in step S37f), the controller 500 in the sheet processing apparatus 100 controls rotations of the exit roller pair 113 and the entrance roller pair 108 to causes the insertion sheet P to abut against the bonded portion of the lamination sheet S and subsequently controls the rotations of the exit roller pair 113 to convey the lamination sheet S in step S37g, which is described in the positioning control using abutting the insertion sheet to the bonded portion of the lamination sheet S with reference to FIG. 30.

On the other hand, In response to a determination that the bonded portion of the lamination sheet S is not in the nip (No in step S37f), the controller 500 in the sheet processing apparatus 100 controls rotations of the exit roller pair 113 to convey the lamination sheet S from the nip by a designated amount in step S37h. In step S37g, the controller 500 in the sheet processing apparatus 100 controls the rotations of the entrance roller pair 108 to cause the insertion sheet P to abut against the nip of the exit roller pair 113 and subsequently controls the rotations of the exit roller pair 113 to start the conveyance of the lamination sheet S, which is described in the positioning control using adjusting a protruding amount of the lamination sheet S from the nip of the exit roller pair 113 with reference to FIGS. 31 and 34.

Subsequently, in step S38, the controller 500 in the sheet processing apparatus 100 determines whether the selected number of insertion sheets P are inserted into the lamination sheet S. After the selected number of insertion sheets P are inserted (Yes in step S38), the controller 500 proceeds to step S39. On the other hand, when the insertion sheet P is subsequently inserted into the lamination sheet S (No in step S38), the controller 500 in the sheet processing apparatus 100 conveys the sheet S by a designated amount in step S38a and proceeds to step S37.

Since the subsequent steps are the same as those described in the flowchart of FIG. 28, the description thereof is omitted.

The embodiments of the present disclosure have been described in detail above. The above-described embodiments are examples and can be modified within the scope not departing from the gist of the present disclosure. For example, any embodiment and any modification may be combined.

Numerous additional modifications and variations are possible in light of the above teachings. It is therefore to be understood that within the scope of the appended claims, the present disclosure may be practiced otherwise than as specifically described herein. The number, position, and shape of the components of the image forming apparatus described above are not limited to those described above.

In the present disclosure, the "end face" of the two-ply sheet is defined as a side face extending in the thickness direction and connecting the front surface and the back surface of the two-ply sheet. Accordingly, a rectangular two-ply sheet has four end faces respectively on the front, back, left, and right sides.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A sheet processing apparatus configured to sandwich one or more sheet media in a two-ply sheet in which two sheets are overlaid and bonded together at a portion of the two-ply sheet, the sheet processing apparatus comprising:
circuitry configured to control insertion processing to insert the one or more sheet media into the two-ply sheet based on a length of the two-ply sheet in a conveyance direction, a length of one of the one or more sheet media in the conveyance direction, and a number of the one or more sheet media.

2. The sheet processing apparatus according to claim 1, wherein the circuitry is configured to perform a single insertion mode to insert one of the one or more sheet media into the two-ply sheet and a multiple insertion mode to insert a plurality of sheet media arranged along the conveyance direction into the two-ply sheet.

3. The sheet processing apparatus according to claim 2, wherein the circuitry is configured to automatically switch to the multiple insertion mode when the length of the one of the one or more sheet media in the conveyance direction is equal to or less than a threshold value.

4. The sheet processing apparatus according to claim 2, wherein the circuitry is configured to automatically switch to the multiple insertion mode when the length of the one of the one or more sheet media in the conveyance direction is equal to or smaller than half the length of the two-ply sheet in the conveyance direction.

5. The sheet processing apparatus according to claim 2, further comprising:
a first tray configured to stack the two-ply sheet;
a size detector for the two-ply sheet disposed on the first tray and configured to detect the length of the two-ply sheet in the conveyance direction;
a second tray configured to stack the one or more sheet media; and
a size detector for the one or more sheet media disposed on the second tray and configured to detect the length of the one of the one or more sheet media in the conveyance direction,
wherein the circuitry is configured to automatically switch to the multiple insertion mode when the length of the one of the one or more sheet media in the conveyance direction is equal to or smaller than half the length of the two-ply sheet in the conveyance direction.

6. The sheet processing apparatus according to claim 2, further comprising
a panel configured to display information and receive an operation input,
wherein the panel is configured to receive selection of any one of the single insertion mode and the multiple insertion mode.

7. The sheet processing apparatus according to claim 1, wherein the circuitry is configured to perform the insertion processing when $L1 \geq L2 \times n$,
where L1 is the length of the two-ply sheet in the conveyance direction, L2 is the length of the one of the one or more sheet media in the conveyance direction, and n is a number of the one or more sheet media.

8. The sheet processing apparatus according to claim 1, further comprising
a notification device configured to output a perceptual signal to a user,
wherein the circuitry is configured to control the notification device to notify the user of a message when $L1 < L2 \times n$,
where L1 is the length of the two-ply sheet in the conveyance direction, L2 is the length of the one of the one or more sheet media in the conveyance direction, and n is a number of the one or more sheet media.

9. The sheet processing apparatus according to claim 1, further comprising:
a rotator; and
a conveyer configured to convey the two-ply sheet to the rotator,
wherein the rotator is configured to wind the two sheets to generate a winding circumferential length difference between the two sheets and separate the two sheets.

10. A laminator comprising:
the sheet processing apparatus according to claim 1; and
a heat and pressure rotator configured to heat and press the two-ply sheet.

11. An image forming system comprising:
an image forming apparatus including an image forming device configured to form an image; and
the sheet processing apparatus according to claim 1.

12. An image forming system comprising:
an image forming apparatus including an image forming device configured to form an image; and
the sheet processing apparatus according to claim 1 detachably attached to the image forming apparatus.

* * * * *